US012627477B2

(12) United States Patent
Wang et al.

(10) Patent No.: US 12,627,477 B2
(45) Date of Patent: May 12, 2026

(54) CRYPTOGRAPHICALLY SECURE LOCATION-BASED CONTENT DISTRIBUTION

(71) Applicant: GOOGLE LLC, Mountain View, CA (US)

(72) Inventors: Gang Wang, Frederick, MD (US); Marcel M. Moti Yung, New York, NY (US)

(73) Assignee: Google LLC, Mountain View, CA (US)

( * ) Notice: Subject to any disclaimer, the term of this patent is extended or adjusted under 35 U.S.C. 154(b) by 14 days.

(21) Appl. No.: 18/852,837

(22) PCT Filed: Jun. 22, 2023

(86) PCT No.: PCT/US2023/025932
§ 371 (c)(1),
(2) Date: Sep. 30, 2024

(87) PCT Pub. No.: WO2024/030201
PCT Pub. Date: Feb. 8, 2024

(65) Prior Publication Data
US 2025/0211429 A1     Jun. 26, 2025

(30) Foreign Application Priority Data
Aug. 5, 2022    (IL) .......................................... 295403

(51) Int. Cl.
*H04L 9/18* (2006.01)
*H04L 9/08* (2006.01)
*H04L 9/32* (2006.01)

(52) U.S. Cl.
CPC ............ *H04L 9/085* (2013.01); *H04L 9/0872* (2013.01); *H04L 9/3213* (2013.01); *H04L 9/3247* (2013.01); *H04L 2209/46* (2013.01)

(58) Field of Classification Search
CPC ..... H04L 9/085; H04L 9/0872; H04L 9/3213; H04L 9/3247; H04L 2209/46
See application file for complete search history.

(56) References Cited

U.S. PATENT DOCUMENTS

2009/0327517 A1* 12/2009 Sivasubramanian ... H04L 67/02
                                                                707/E17.014
2018/0219677 A1*  8/2018 Nair .................... H04L 63/0421
                    (Continued)

OTHER PUBLICATIONS

International Preliminary Report on Patentability in International Appln. No. PCT/US2023/025932, mailed on Feb. 20, 2025, 10 pages.

(Continued)

*Primary Examiner* — Michael Won
(74) *Attorney, Agent, or Firm* — Fish & Richardson P.C.

(57) ABSTRACT

Methods, systems, and apparatus, including computer programs encoded on a computer storage medium, for using cryptographic techniques to enhance data security and privacy and increase computational efficiency in selecting digital components are described. In one aspect, a method includes receiving, by an MPC computer of a group of MPC computers configured to perform computations of a secure MPC protocol to select digital components for distribution to client devices, a first secret share of location information indicating a location of a client device. The MPC computer generates, by performing the computations of the secure MPC protocol in collaboration with one or more second computers of the group of MPC computers, a first secret share of a selection result including data identifying a selected digital component that is selected from candidate digital components that are candidates based at least in part on the location of the client device.

20 Claims, 6 Drawing Sheets

(56)                References Cited

U.S. PATENT DOCUMENTS

| | | | |
|---|---|---|---|
| 2020/0082113 A1 | 3/2020 | Van Liesdonk et al. | |
| 2020/0242466 A1* | 7/2020 | Mohassel ............... | G06N 3/048 |
| 2020/0336313 A1* | 10/2020 | Knox ...................... | H04L 63/10 |
| 2022/0405746 A1* | 12/2022 | Mamoni ............ | G06Q 20/3825 |
| 2023/0361986 A1* | 11/2023 | Genise .................... | G06F 21/72 |
| 2025/0211431 A1* | 6/2025 | Nara ......................... | H04L 9/08 |

OTHER PUBLICATIONS

Github.com [online], "Dovekey" Sep. 2020, retrieved on Jan. 2, 2025, retrieved from URL <https://github.com/google/ads-privacy/tree/master/proposals/dovekey>, 7 pages.

Github.com [online], "Dovekey_auction.md" Jan. 2021, retrieved on Jan. 2, 2025, retrieved from URL <https://github.com/google/ads-privacy/blob/master/proposals/dovekey/dovekey auction.md>, 9 pages.

Github.com [online], "Dovekey_auction_secure_2pc.md" Mar. 2021, retrieved on Jan. 2, 2025, retrieved from URL <https://github.com/google/ads-privacy/blob/master/proposals/dovekey/dovekey_auction_secure_2pc.md>, 17 pages.

International Search Report and Written Opinion in International Appln. No. PCT/US2023/025932, mailed on Nov. 14, 2023, 17 pages.

Invitation to Pay Additional Fees in International Appln. No. PCT/US2023/025932, mailed on Sep. 21, 2023, 10 pages.

Office Action in Israeli Appln. No. 295403, mailed on Sep. 30, 2024, 4 pages.

S2geometry.io [online], "S2 Cells" Apr. 2018, retrieved on Jan. 2, 2025, retrieved from URL <http://s2geometry.io/devguide/s2cell_hierarchy.html>, 27 pages.

Symeonidis et al., "PePTCAP: A Privacy-enhancing Protocol for (Temporary) Car Access Provision," Proceeding of International Association for Cryptologic Research (IACR), Jan. 16, 2017, 21 pages.

Wikipedia.org [online], "Bloom Filter" created on Apr. 2004, retrieved on Jan. 2, 2025, retrieved from URL <https://en.wikipedia.org/wiki/Bloom_filter>, 25 pages.

Wikipedia.org [online], "Distributed point function" created on Oct. 2017, retrieved on Jan. 2, 2025, retrieved from URL <https://en.wikipedia.org/wiki/Distributed_point_function>, 2 pages.

Wikipedia.org [online], "Elliptic Curve Digital Signature Algorithm" created on Feb. 2004, retrieved on Jan. 2, 2025, retrieved from URL <https://en.wikipedia.org/wiki/Elliptic_Curve_Digital_Signature_Algorithm>, 8 pages.

Wikipedia.org [online], "False positive rate" created on Apr. 2009, retrieved on Jan. 2, 2025, retrieved from URL <https://en.wikipedia.org/wiki/False_positive_rate>, 3 pages.

Wikipedia.org [online], "Secure multi-party computation" created on May 2004, retrieved on Jan. 2, 2025, retrieved from URL <https://en.wikipedia.org/wiki/Secure_multi-party_computation>, 13 pages.

* cited by examiner

400

500

510
Receive a message that includes an attestation token from a client device

520
Evaluate integrity of attestation token

530
Verified?

No

Yes

560
Ignore message

550
Perform computations to generate secret share of result data

560
Send secret share of result data to client device

600

620

Memory

610

Processor

630

Storage Device

640

Input/Output

650

660

External Devices

CRYPTOGRAPHICALLY SECURE LOCATION-BASED CONTENT DISTRIBUTION

CROSS-REFERENCE TO RELATED APPLICATIONS

This application is a National Stage Application under 35 U.S.C. § 371 and claims the benefit of International Application No. PCT/US2023/025932, filed Jun. 22, 2023, which claims the benefit of priority to Israeli Application Serial No. 295403, filed Aug. 5, 2022. The foregoing applications are incorporated herein by reference in their entireties and for all purposes.

TECHNICAL FIELD

This specification relates to cryptography, data processing, data security, and privacy.

BACKGROUND

Secure MPC is a family of cryptographic protocols that prevents access to data by distributing computations across multiple parties such that no individual party can access another party's data or intermediate computed values, while outputs are released only to designated parties. The MPC computing systems typically perform the computations using secret shares or other encrypted forms of the data and secure exchange of information between the parties.

SUMMARY

In general, one innovative aspect of the subject matter described in this specification can be embodied in methods that include the actions of receiving, by a first multi-party computation (MPC) computer of a group of MPC computers configured to perform computations of a secure MPC protocol to select digital components for distribution to client devices, a first secret share of location information indicating a location of a client device; generating, by the first MPC computer performing the computations of the secure MPC protocol in collaboration with one or more second computers of the group of MPC computers, a first secret share of a selection result including data identifying a selected digital component that is selected from candidate digital components that are candidates for display at the client device based at least in part on the location of the client device; and sending, to the client device, the first secret share of the selection result. Other embodiments of this aspect include corresponding systems, apparatus, and computer programs, configured to perform the actions of the methods, encoded on computer storage devices.

These and other implementations can each optionally include one or more of the following features. In some aspects, generating the first secret share of the selection result includes generating, for each digital component in a set of digital components, a first secret share of a candidate parameter that indicates whether the digital component is a candidate for display at the client device based on the location of the client device.

In some aspects, generating the first secret share of the selection includes generating a garbled circuit based on (i) the location of the client device, (ii) a table of geographic location identifiers and, for each geographic location identifier, one or more geographical areas corresponding to the geographic location identifier, and (iii) for each of a plurality of digital components, data indicating a candidate expression that defines at least one or more geographic category identifiers for which the digital component is a candidate for selection and evaluating the garbled circuit to identify the candidate digital components.

The computer-implemented method of any preceding claim, wherein the candidate expression for at least one digital component further defines one or more user groups for which the at least one digital component is a candidate for selection.

In some aspects, generating the first secret share of the selection result includes identifying the candidate digital components based on geographic category identifiers corresponding to each digital component. Each geographic category identifier corresponds to one or more related geographical areas. Identifying the candidate digital components based on geographic category identifiers corresponding to each digital component includes determining, for each digital component, whether the location information matches a geographical area of a geographic category identifier corresponding to the digital component.

In some aspects, receiving the first secret share of the location information indicating a location of the client device includes receiving an attestation token including, as payload data, the first secret share of the location information and a device integrity element comprising a verdict of trustworthiness of the client device and verifying integrity of the attestation token. The attestation token can include a digital signature generated using the set of data and a private key of the client device. Verifying the integrity of the attestation token can include determining that the digital signature is valid using the set of data and a public key corresponding to the private key.

In some aspects, the first MPC computer and each of the one or more second MPC computers generate the first secret share of the selection result and a respective secret share of the selection result held by each second MPC computer based on the first secret share of the location match result and a respective second secret share of the location match result held by each second MPC computer.

In some aspects, the location of the client device is a current location of the client device. In some aspects, the location information indicates one or more previous locations of the client device.

In general, one innovative aspect of the subject matter described in this specification can be embodied in methods that include the actions of receiving, from a client device by a first multi-party computation (MPC) computer of a group of MPC computers, a request that includes an attestation token. The attestation token includes a set of data including payload data that includes a first secret share of secret data and a device integrity element including a verdict of trustworthiness of the client device. The attestation token includes a digital signature generated using the set of data and a private key of the client device. The method includes the actions of verifying integrity of the attestation token, the verifying including determining that the digital signature is valid using the set of data and a public key corresponding to the private key. The method includes the actions of, in response to verifying the integrity of the attestation token, generating a first secret share of result data by performing one or more computations using the first secret share of the secret data a secure MPC protocol in collaboration with one or more second MPC computers of the group of MPC computers and sending the first secret share of the result data to the client device. Other embodiments of this aspect include corresponding systems, apparatus, and computer programs, configured to perform the actions of the methods, encoded on computer storage devices.

These and other implementations can each optionally include one or more of the following features. In some aspects, the payload data includes location information indicating one or more locations of the client device. The result data can include a selection result identifying a selected digital component selected using the one or more computations.

In some aspects, the verdict of trustworthiness indicates a level of trustworthiness assigned to the client device by a device evaluator based on an evaluation of signals received from the client device. Verifying the integrity of the attestation token can include determining that the level of trustworthiness indicates that the client device is trustworthy.

In some aspects, the device integrity element includes a device integrity token comprising an additional digital signature generated using the verdict of trustworthiness and a private key of the device evaluator.

In some aspects, the attestation token includes a timestamp indicating a time at which the attestation token is created. Verifying the integrity of the attestation token can include determining that the time at which the attestation token is created is within a threshold amount of time from a current time.

In some aspects, performing one or more computations using the secure MPC protocol in collaboration with one or more second MPC computers of the group of MPC computers includes performing the one or more computations using the first secret share of the secret data and a respective second secret share of the secret data held by each second MPC computer.

Particular embodiments of the subject matter described in this specification can be implemented so as to realize one or more of the following advantages. Using a secure MPC process performed by two or more MPC computers (e.g., server computers) operated by different parties to select digital components based on secret shares of user information, e.g., secret shares of location information, ensures that the user information cannot be accessed in cleartext by either MPC computer or another party absent unauthorized collusion between the MPC computers. In this way, user data privacy and data security is improved. For example, even where only one MPC computer is honest, preservation of user data privacy and security may still be ensured. Herein, a "secret share" may be defined as a share of a piece of information (e.g., location information, or a selection result) which is to be kept secret. Each secret share may be encrypted, for example, by the client device. Secret shares may be combinable by a predetermined number of MPC computers to reconstruct the piece of information.

Using a secure MPC protocol to perform computations using location information keeps the location information private from every party outside of the client device, which is critical for user privacy and security. Other user information, such as user group membership information is treated in a similar manner to ensure that user privacy and security is maintained throughout the online ecosystem and throughout the digital component selection and distribution processes.

In a digital component selection process, the MPC computers can select from candidate digital components that satisfy one or more conditions while preventing the parties from accessing user information in cleartext. The conditions can include the eligibility of each digital component based on guidelines for the inclusion or exclusion of the digital component based on the current location of the client device (e.g., the location of presence of the client device) at which the selected digital component will be displayed. The conditions can also include, for example, user group membership, frequency control, muting (e.g., user blocking), k-anonymity for preventing micro-targeting of users, and/or pacing and budget constraints.

As the selection of digital components is an online process that typically occurs at the time that content is being loaded at a client device, it is important that this process be completed quickly, e.g., within milliseconds. The techniques described in this document enhances the speed at which digital components are selected by reducing the size of data transmitted between the client device and the MPC cluster, by generating and sending a composite request for digital components and reducing the computational resources required by the MPC cluster, and by reducing the number of roundtrip communications/computations performed by the computers of the MPC cluster and the size of data transmitted between the computers. The reduction in data size between the client device and computers also reduces network bandwidth consumption and battery consumption of the client device, e.g., if the client device is a mobile device running on battery power.

A client device of a user can generate a probabilistic data structure, e.g., a cuckoo filter or a Bloom filter that represents user groups that includes the user as a member and can provide the probabilistic data structure, or data that represents the probabilistic data structure, to the computers of the MPC cluster. Using probabilistic data structures in this way protects user privacy and maintains data security by preventing access to the user's group membership, and reduces the size of the information provided to the MPC cluster as probabilistic data structures are compact representations of sets of data. The data representing the probabilistic data structure can be generated and sent to the MPC computers such that no party that receives only a portion of the data can access the user group membership of a user without either having the other portions or colluding with the other MPC computers, i.e., communication not permissible by the secure MPC process. The secure MPC process does not leak the user group membership to any party, entity, software, or process. The reduction in data size reduces the amount of bandwidth consumed to transmit the information, reduces the latency in transmitting the information, and reduces the amount of processing power and associated battery power for devices running on batteries (e.g., mobile devices) required to transmit the information.

The MPC cluster can transmit secret shares of a result that identifies a selected digital component that the MPC cluster selected using the secure MPC process. By sending secret shares of a result for only selected digital components rather than information for all or a large set of digital components similarly reduces latency and consumed bandwidth, processing power, and battery power in transmitting and receiving the result. This also reduces the potential leakage of confidential information of content platforms that submit selection values for digital components to the MPC cluster by limiting the number of digital components for which information is provided to the client device.

Reducing the latency in content presentation also reduces the number of errors that occur at user devices while waiting for such content to arrive. As the content often needs to be provided in milliseconds and to mobile devices connected by wireless networks, reducing the latency in selecting and providing the content is critical in preventing errors (e.g., errors that occur when content fails to load) and reducing user frustration.

Attestation tokens can be used to send secret shares of secret data, e.g., secret share(s) of device location information, user group membership information, or machine learning training data, to ensure that the secret data is received from a trustworthy device. The attestation tokens provide a secure channel using digital signature techniques to enable the detection of data manipulation and to ensure that the attestation token is sent from the purported sender. The attestation token can include a device integrity element, e.g., a device integrity token, that attests to the trustworthiness of the client device and/or application that sends the attestation token. The device integrity token can include a verdict of trustworthiness assigned to the client device and/or application by a trusted device evaluator and can include a digital signature that also ensures that the device integrity token is generated and sent by the trusted device evaluator. The combination of digital signatures binds the device integrity token to the client device sending the attestation token such that the verdict of trustworthiness assigned to the client device by the trusted evaluator cannot be falsified.

The techniques described in this document prevent the tracking and profiling of users based on their information, including their location information. As the location information is sent in the form of secret shares, the location information is meaningless outside of the digital component selection process. The MPC computers can also be configured to delete the secret shares of the location information and any other user information after the selection process is completed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, this document describes systems and techniques for protecting the security of data and privacy of users in content selection and distribution using cryptographic techniques. A group of MPC computers, which can be referred to as an MPC cluster, can collaborate to perform a secure MPC process to select digital components based on user information without either MPC computer or any other party being able to access the user information in cleartext absent unauthorized collusion between the MPC computers.

Location information indicating the location of a client device is used in digital component selection and distribution for many purposes, including legal compliance (e.g., to ensure compliance with local regulations), relevance (e.g., to avoid providing content for a local event or organization far from that local area), user protection (e.g., to prevent age inappropriate content from being sent to users in primary schools), and for testing of digital component effectiveness with live experiments performed based on the location of devices. At the same time, location information is private user information that should be protected, e.g., to prevent micro-targeting (e.g., identifying a particular user and the user's granular location, and providing content based on that information) and user profiling (e.g., collecting a history of a user's location information). In some cases, historical location information can be used, but only with permission from the user by opting in to such historical use. The techniques described in this document enable the use of location information in digital component selection and distribution, while also preventing micro-targeting and user profiling. In fact, no entity outside of the user's client device has access to the user's location information in cleartext, including the MPC computers selecting the digital components. The MPC protocol guarantees that nobody and nothing can build users' location profiles, or use users' location profiles for any purposes.

In addition, techniques described in this document ensure that the location information that is masked using the secret sharing is anonymous. For example, location information that can be used to select digital components may only be eligible for such use if the geographical area is large and there are a large number of active users in the geographical area. This ensures that the location information could apply to any number of users in that geographical area, which makes the user anonymous among those many users.

Figure 1:
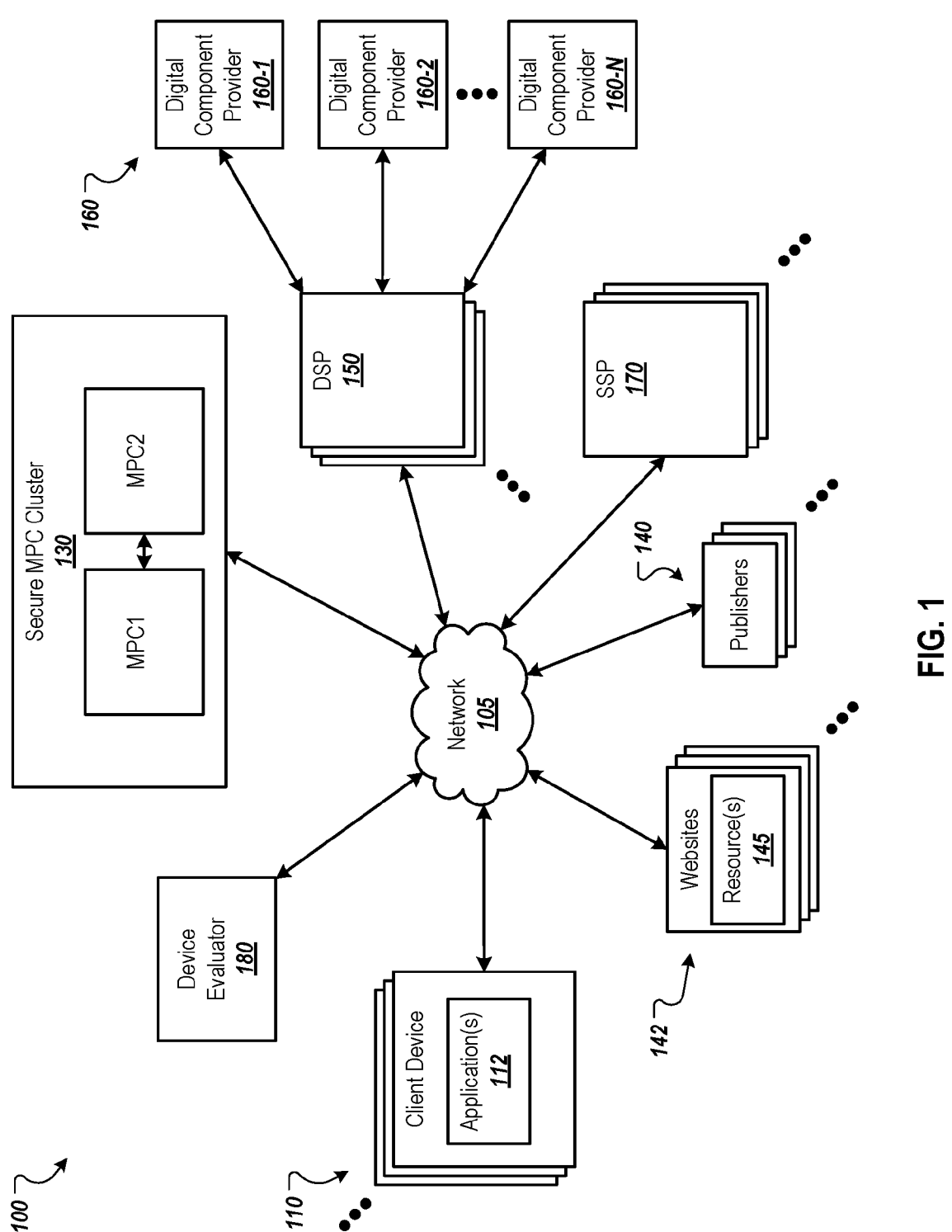
FIG. 1 is a block diagram of an example environment in which an MPC cluster performs secure MPC processes to select digital components for distribution to client devices.

FIG. 1 is a block diagram of an example environment 100 in which an MPC cluster 130 performs secure MPC processes to select digital components for distribution to client devices 110. The example environment 100 includes a data communication network 105, such as a local area network (LAN), a wide area network (WAN), the Internet, a mobile network, or a combination thereof. The network 105 connects the client devices 110, the MPC computers of the secure MPC cluster 130, publishers 140, websites 142, content platforms, e.g., supply-side platforms (SSPs) 170 and demand-side platforms (DSPs) 150, and a device evaluator 180. The example environment 100 can include many different client devices 110, secure MPC clusters 130, publishers 140, websites 142, DSPs 150, SSPs 170, and device evaluators 180.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming console, or a virtual reality system.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher 140.

A client device 110 can also include a trusted program. The trusted program can include trusted code from a reliable source that is difficult to falsify. For example, the trusted program can be an operating system, a portion of an operating system, a web browser, or another appropriate trusted program.

Some resources, application pages, or other application content can include one or more digital component slots for presenting, e.g., displaying and/or playing, digital components with the resources 145 or application pages. A digital component slot is an area of an electronic resource (e.g., web page or native application page or other type of native application content) for displaying a digital component. A digital component slot can also refer to a portion of an audio stream (which is another example of an electronic resource) for playing a digital component. An electronic resource is also referred to herein as a resource for brevity.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can generate a request for a digital component for each digital component slot. In some implementations, the digital component slot and/or the resource can include code (e.g., scripts) that cause the application 112 to request digital components from the MPC cluster 130, which selects digital components and provides the digital components (or data that references the digital components) to the application 112 for presentation to a user of the client device 110.

Some publishers 140 use an SSP 170 to manage the process of obtaining digital components for digital component slots of its resources. An SSP 170 is a technology platform implemented in hardware and/or software that automates the process of obtaining digital components for the resources and/or applications. Each publisher 140 can have a corresponding SSP 170 or multiple SSPs 170. Some publishers 140 can use the same SSP 170.

Digital component providers 160 can create (or otherwise publish) digital components that are presented in digital component slots of publisher's resources and applications. The digital component providers 160 can use a DSP 150 to manage the provisioning of its digital components for presentation in digital component slots. A DSP 150 is a technology platform implemented in hardware and/or software that automates the process of distributing digital components for presentation with the resources and/or applications. A DSP 150 can interact with multiple SSPs 170 on behalf of digital component providers 160 to provide digital components for presentation with the resources of multiple different publishers 140.

In general, a DSP 150 can receive requests for digital components (e.g., from an SSP), generate (or select) a selection value for one or more digital components created by one or more digital component providers based on the request, and provide data related to the digital component (e.g., the digital component itself) and the selection value to an SSP 170. The selection value can indicate an amount that the digital component provider 160 is willing to provide for presentation or user interaction with the digital component. The SSP 170 can provide the digital components and selection values to the MPC cluster 130 for inclusion in digital component selection processes performed by the MPC cluster 130.

In some cases, it is beneficial to a user to receive digital components related to their interests, which can be inferred based on their interactions with electronic resources, e.g., based on electronic resources visited by the users. To provide digital components based on interests, while preserving the privacy of the users, users can be assigned to user groups in various ways. Such membership data can be stored at the client device 110, e.g., by the trusted program, such that no entity other than the user can access the data identifying the user groups to which the user has been assigned. This can also provide transparency to the user, e.g., by enabling the user to view the user groups to which the user has been assigned, remove the user from such user groups, and/or select which user groups can be used in selecting digital components for presentation to the user.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

As mentioned above, to protect user privacy, a user's group membership can be maintained at the user's client device 110, e.g., by one of the applications 112, or the operating system of the client device 110, rather than by a digital component provider, content platform, or other party. In a particular example, the trusted program of the client device 110 can maintain a list of user group identifiers ("user group list") for a user using the web browser or another application (e.g., for a user logged into the browser, application, or the client device 110). The user group list can include a group identifier for each user group that includes the user as a member. The digital component providers 160 that create the user groups can specify the user group identifiers for their user groups. In some implementations, client devices 110 can also add the user to user groups. For example, the client device 110 can detect that it is in Manhattan, NY and add itself (or the user) to the "Devices in Manhattan, NY" group to support location-based digital component distribution. The user group identifier for a user group can be descriptive of the group (e.g., gardening group) or a code that represents the group (e.g., an alphanumeric sequence that is not descriptive). Thus, a user group can be a location-based group, in some implementations. The user group list for a user can be stored in secure storage at the client device 110 and/or can be encrypted when stored to prevent others from accessing the list.

The MPC cluster 130 can use the user group membership of a user to select digital components or other content that may be of interest to the user or may be beneficial to the user/user device in another way. For example, such digital components or other content can include data that improves a user experience, improves the running of a client device 110 or benefits the user or client device 110 in some other way. However, the user group identifiers of the user group list of a user can be provided and used to select digital components in ways that prevent the computing systems MPC1 and MPC2 of the MPC cluster 130 from accessing the user group identifiers for the user in cleartext, thereby preserving user privacy when using user group membership data to select digital components. Cleartext is text that is not computationally tagged, specially formatted, or written in code, or data, including binary files, in a form that can be viewed or used without requiring a key or other decryption device, or other decryption process.

For example, the user group membership information can be sent to the MPC computers of the MPC cluster 130 in the form of secret shares and the computing systems can perform a secure MPC process to select digital components based on the user group membership of the user. By sending the information in secret shares, no entity including the MPC computers can access the user group membership absent unauthorized collusion between the MPC computers, thereby enhancing the user privacy and data security.

The secure MPC cluster 130 includes two computers MPC1 and MPC2 that perform secure MPC processes to select digital components for distribution to client devices 110 of users based on the user's group membership, but without accessing the group membership information in cleartext. Although the example MPC cluster 130 includes two MPC computers, more MPC computers can also be used as long as the MPC cluster 130 includes more than one computer. For example, the MPC cluster 130 can include three computers, four computers, or another appropriate number of computers. Using more computers in the MPC cluster 130 can provide more security, but can also increase the complexity of the MPC processes.

The MPC computers, e.g., MPC1 and MPC2, can be operated by different entities. In this way, each entity is unable to access the users' group membership in cleartext. For example, one of MPC1 or MPC2 can be operated by a trusted party different from the users, the publishers 140, the DSPs 150, the SSPs 170, and the digital component providers 160. For example, an industry group, governmental group, or browser developer can maintain and operate one of the computing systems MPC1 and MPC2. The other of MPC1 or MPC2 may be operated by a different one of these groups, such that a different trusted party operates each of MPC1 and MPC2. Preferably, the different parties operating the different MPC computers have no incentive to collude to endanger user privacy. In some implementations, the MPC computers MPC1 and MPC2 are separated architecturally and are monitored to not communicate with each other outside of performing the secure MPC processes.

MPC1 and MPC2 can each store digital components (e.g., the creatives for the digital components), selection values for digital components, and other data for digital components. For example, MPC1 and MPC2 can cache selection values and other data for digital components previously received from SSPs 170 and/or DSPs 150 as part of previous digital component selection processes or that are otherwise provided to MPC1 and MPC2, e.g., that are provided in advance for use in digital component selection processes. In this way, the MPC cluster 130 can use the selection values and other data to select digital components for distribution to client devices 110 in response to future digital component requests received from client devices 110.

A digital component for which a selection value and other information is stored by the MPC cluster 130 for digital component selection processes can be referred to as a stored digital component in this document. However, the digital component itself is not necessarily stored by the MPC cluster 130. Instead, the MPC cluster 130 can store data, e.g., code that references a network location from which the digital component can be downloaded, for each stored digital component. In some implementations, the digital component itself is stored, and is returned to the application 112 directly, by the MPC cluster 130. Such implementation reduces the need for application 112 to fetch the digital components, and/or other information for digital components, in additional requests that may consume battery and bandwidth of the device, and may leak additional signals for the server hosting the digital component itself to track the device.

For each stored digital component, MPC1 and MPC2 can each store a selection value or a vector of values that can be used by MPC1 and MPC2 to determine a selection value for the digital component. In some implementations, the digital component, its selection value or vector, and metadata for the digital component is stored in the form of a byte array, which can also be referred to as a digital component information element.

MPC1 and MPC2 can also store, for each digital component, condition data that defines condition(s) that must be met for the digital component to be a candidate for a given digital component selection process. A stored digital component can have zero or more corresponding conditions, but typically each digital component will have at least one condition. The condition data can be in the form of a candidate expression with candidate parameters, which can be a Boolean expression that is evaluated by MPC1 and MPC2 to determine whether the digital component is a candidate for selection in a digital component selection process.

One example condition is that the user to which a selected digital component will be provided is a member of a user group corresponding to the stored digital component. This condition can be referred to as a user group membership condition. In this example, MPC1 and MPC2 can store, for a stored digital component, a set of one or more user group identifiers that correspond to the digital component. These user group identifiers identify the user groups for which the stored digital component can be provided. That is, the stored digital component is only a candidate for a digital component selection process that is performed to select a digital component to provide to a user that is a member of at least one of the user groups identified by the set of one or more user group identifiers for the stored digital component.

Another example condition for a stored digital component is a frequency cap condition that indicates that the digital component, or digital components of a particular category, can only be provided to the same user a maximum number of times over a given time duration. Another example condition for a digital component is a blocked digital component condition that indicates that the digital component has been blocked, e.g., muted, by a user. For these example conditions, MPC1 and MPC2 can receive, for each of multiple users, a probabilistic data structure, e.g., a cuckoo filter or Bloom filter, that represents digital components that cannot be provided to the user. For example, the probabilistic data structure can represent universal identifiers for digital components that are blocked either by the user directly or due to the frequency at which the digital component is displayed to the user being exceeded during the given time duration.

MPC1 and MPC2 can receive the probabilistic data structures from the client devices 110 of the users, e.g., in an encrypted form that prevents either computing system MPC1 or MPC2 from accessing the identifiers in cleartext. For example, the application 112 running on a user's client device 110 can generate a Bloom filter that represents the identifiers for the blocked digital components that are blocked due to frequency capping or blocked by the user. The application 112 can then provide data to each of MPC1 and MPC2 that enable MPC1 and MPC2 to collaboratively query the Bloom filter using a secure MPC process to determine whether a given digital component is blocked for the user. MPC1 and MPC2 calculate secret shares of a blocked digital component condition using the secure MPC process.

Another example condition for a stored digital component is a pacing condition that paces the distribution of the digital component over a time duration. MPC1 and MPC2 can store data that indicates the total number of times the digital component can be provided over a time duration and/or a maximum budget for the digital component for the time duration. MPC1 and MPC2 can use this information to pace how often the digital component can be a candidate for digital component selection processes based on this condition (e.g., all conditions for the digital component would have to be satisfied for the digital component to be a candidate). In some implementations, MPC1 and MPC2 can implement a feedback controller, e.g., a proportional-integral-derivative (PID) controller using secret shares to pace stored digital components that have a pacing condition.

Another example condition is a k-anonymity condition. A k-anonymity condition can include a k-anonymity rule that requires that a digital component be eligible (or would have been selected) for distribution to at least k users over a given duration of time. The concept of k-anonymity ensures that data for a particular user is not distinguishable from the data of a threshold number k of other users. The system can enforce a k-anonymity rule, for example, by ensuring that a particular digital component is distributed to a client device 110 in response to a request for one or more digital components, and the same digital component could have been, or was, displayed to a set of at least k users or by at least k applications 112 within a particular period of time. In some implementations, each of the k applications 112 to which the digital component could have been, or was distributed must be for a different user. In this example, the computing systems MPC1 and MPC2 can store, for a digital component, the value k and maintain a number of users to which the digital component could have been distributed.

Another example condition is a location condition. A digital component can be eligible for display on client devices 110 located in one or more particular geographical areas and/or ineligible for display on client devices 110 located in one or more particular geographical areas. Geographic category identifiers are used to evaluate location information to determine whether digital components are candidates for presentation by client devices 110.

A geographic category identifier can correspond to one or more related geographical areas. The MPC cluster 130 can maintain a list of geographic category identifiers. The list of geographic categories can be a list of identifiers agreed upon by entities involved in the digital component distribution process, e.g., browser developers, digital component providers 160, content platforms, publishers 140, etc.

In some implementations, the list of geographic category identifiers can be limited to particular types of related geographical areas. For example, entities may not allow some types of areas to be used for the purposes of selecting digital components for presentation to users. Eligible types of geographic category identifiers can include identifiers based on, for example, administrative areas (e.g., city, state, etc.), the geographic nature of the areas (e.g., national park, lakes, etc.), the economical nature of the areas (shopping mall, convention center, etc.), and/or the social function of the areas (school, medical facility, etc.).

For example, the list of geographic category identifiers can include identifiers for administrative areas such as countries, states, provinces, counties, metropolitan areas, cities, postal codes, districts, and/or other appropriate administrative areas. The list of geographic category identifiers can include identifiers for national parks, lakes, beaches, mountains, deserts, and/or other appropriate types of areas. The list of geographic category identifiers can include identifiers for shopping malls, convention centers, restaurants, at or near particular businesses or store brands, and/or other economical types of areas. The list of geographic category identifiers can include identifiers for schools, medical facilities, public transportation, public parks, residential neighborhoods, and/or other social function types of areas.

The geographic category identifiers can also be based on a combination of types. For example, the list can include identifiers for schools in a particular city or shopping malls in a particular state.

The geographic category identifiers in the list can be hierarchical. For example, there can be a geographic category identifier for a particular country, respective geographic category identifiers for the states or provinces in the particular country, respective geographic category identifiers for the cities within each state or province, and respective geographic category identifiers for the districts within each city. In another example, there can be a geographic category identifiers for all educational facilities, a geographic category identifier for each type of school (e.g., primary school or secondary school), and for, each type of school, a geographic category identifier for each of multiple sub-types (e.g., university, technical school, trade school, high school, middle school, elementary school, preschool, and so on).

A geographical area can correspond to multiple geographic category identifiers. For example, a particular elementary school in a particular city can correspond to a geographic category identifiers for schools, elementary schools, the particular elementary school, primary schools, the particular city, a state or province in which the particular city is located, and potentially other identifiers.

Each geographic category identifier can correspond to, e.g., be linked to in the list or in a database, location data defining the geographical area(s) that are represented by the identifier. The location data for each geographic category identifier can include coordinates (e.g., longitude and latitude coordinates) for each geographical area corresponding to the identifier (which can be referred to as geofencing), Internet Protocol (IP) addresses for each geographical area corresponding to the identifier, and/or the S2 cell identifier (S2CellId) of the S2 library for each geographical area corresponding to the identifier.

MPC1 and MPC2 can store a table or other appropriate data structure that includes the location information for each geographic category identifier. For example, MPC1 and MPC2 can each store a lookup table with the keys of the lookup table being the S2 cell identifiers (or other location information) and, for each key, the list of one or more geographic category identifiers corresponding to the S2 cell identifier (or other location information). As described in more detail below, MPC1 and MPC2 can use the table to identify candidate digital components when selecting digital components to provide to client devices 110 in response to digital component requests.

An entity that approves the permissible geographic category identifiers can ensure that each geographic category identifier and its corresponding geographical area(s) satisfy user privacy constraints. One example constraint is a minimum area size constraint. In this example, the geographical area(s) for a geographic category identifier has to have a total geographic area that satisfies a threshold area size, e.g., by meeting or exceeding the threshold area size. If a geographic category identifier includes multiple geographical areas, the sum of these areas can be compared to the threshold area size. For example, the geographical area occupied by a particular chain store may not satisfy the threshold area size alone. However, the sum of the areas of multiple of the chain stores may satisfy the threshold area size. In this example, a geographic category identifier for one of the chain stores could not be used to identify candidate digital components, but a geographic category identifier for multiple chain stores that satisfy the threshold area size could be used.

Another example constraint is a minimum number of users constraint. In this example, the geographical area(s) for a geographic category identifier has to have a total number of users in those areas that satisfies a threshold number of users, e.g., by meeting or exceeding the threshold number of users. Similar to the minimum area size constraint, this threshold can be satisfied by the total number of users in multiple geographical areas corresponding to the geographic category identifier.

The number of users in a geographical area can be obtained from various sources. In some implementations, the number of users in a geographical area can be the number of active users in the area. For example, the number of users in the area can be the number of client devices that are connected to, or have recently been connected to, a network in the geographical area. This data can be obtained from, for example, cell tower connection data for mobile devices, which can enable real time comparison for real time enabling and disabling of geographic category identifiers. Other sources can include census data, average visitor information (e.g., for national parks or stores), and Internet subscriber data.

Ensuring that geographic category identifiers meet these conditions protects user privacy by ensuring that users are not micro-targeted based on granular location details and are anonymous among many other users. Other appropriate conditions can also be used for identifying geographic category identifiers that can be used for selecting digital components for distribution to client devices 110.

In some implementations, the MPC cluster 130, SSP170, DSP 150, or another computing system determines whether a geographic category identifier satisfies the constraint(s) prior to enabling the geographic category identifier to be used in selecting digital components for distribution to client devices 110. The computing system that performs this evaluation can perform the evaluation when a new geographic category identifier is created and/or on an ongoing basis. For example, the computing system can perform the evaluation periodically according to a specified time period. In this way, the computing system can disable the use of geographic category identifiers that no longer satisfy the constraint(s).

A digital component can have zero or more positive geographic category identifiers and zero or more negative geographic category identifiers. A positive geographic identifier is an identifier for which the digital component is eligible for selection and a negative geographic category identifier is an identifier for which the digital component is not eligible for selection. Thus, if a digital component provider 160 or DSP 150 wants the digital component to be presented to users in geographical areas corresponding to a geographic category identifier, the digital component provider 160 or DSP 150 can assign the geographic category identifier as a positive geographic category identifier for the digital component. For example, a local restaurant can assign the geographic category identifier for the area in which the local restaurant is located as a positive geographic category identifier for digital components related to the local restaurant.

If the digital component provider 160 or DSP 150, or another entity, does not want the digital component to be presented to users in geographical areas corresponding to a geographic category identifier, the digital component provider 160 or DSP 150 can assign the geographic category identifier as a negative geographical identifier for the digital component. For example, digital components having content that is not appropriate for children may be assigned geographic category identifiers for primary schools as negative geographic category identifiers.

The constraints can be based on the sensitivity of the geographical area(s) corresponding to the geographic category identifiers. For example, the use of positive geographic category identifiers for sensitive locations may not be allowed. However, these geographic category identifiers may be used as negative geographic category identifiers.

In some implementations, the MPC cluster 130 can allow location based conditions to be expressed using an intersection of multiple geographic category identifiers. However, a content platform may generate a condition using a logical AND between multiple geographic category identifiers that each satisfy the constraints but the intersection does not. In this example, an entity, e.g., the MPC computers or a content platform, can evaluate each condition to ensure that the intersection satisfies the constraints. This can be performed when a new condition is received and/or periodically. In another example, the MPC cluster 130 can be configured to perform a k-anonymity check on the digital component, as described herein.

Similar to the user group membership data, location information that indicates the geographic location of a client device 110 can be sent in the form of secret shares to prevent MPC1 and MPC2 and any other entity from accessing the location information in cleartext. As described in more detail below, the location information can be sent using attestation tokens that provide a chain of trust to ensure that the location information is accurate and is received from a trustworthy client device 110.

Other appropriate conditions can also be used to determine whether digital components are candidates for a selection process to select a digital component for a digital component slot. Each digital component provider 160 or a content platform (e.g., DSP 150) for the digital component provider 160 can provide the condition data for the provider's digital component(s) to the MPC cluster 130.

As described above, the condition data for a digital component can be in the form of a candidate expression. A candidate expression can be a Boolean expression that includes multiple condition parameters and Boolean operators. In this example, a digital component can be a candidate for selection in a digital component selection process if the candidate expression evaluates to a value of True. If not, the digital component may not be a candidate and therefore cannot be selected by the MPC cluster 130 for that digital component selection process.

The candidate expression and the candidate parameters can be received and stored in the form of secret shares by MPC1 and MPC2. For example, MPC1 can receive and store a first secret share of the candidate expression for a digital component and MPC2 can receive and store a second secret share of the candidate expression for the digital component. In addition, each MPC computer can store a respective secret share of the value of each candidate parameter for each candidate expression.

In some implementations, each stored digital component can also be associated with, e.g., linked to, contextual conditions that define the context in which the digital component is eligible for display or a particular selection value (or particular vector) for the digital component is eligible for use in a digital component selection process. For example, a digital component may only be eligible for display with particular resources of particular Universal Resource Locators (URLs). In another example, a digital component can have different selection values that each correspond to different sets of contextual signals.

MPC1 and MPC2 can identify eligible digital components for a digital component request based on the contextual data of the digital component request and the contextual conditions for the digital components. In some implementations, MPC1 and MPC2 compare, for each digital component, each contextual signal to a corresponding eligibility condition. For example, MPC1 and MPC2 can compare the URL of a digital component request to the eligible URLs for a digital component, which can be expressed as an eligibility condition.

In some implementations, each digital component is stored in a table or other appropriate data structure with a lookup key that includes a set of zero or more contextual conditions (e.g., where each condition is a set of one or more contextual signals that must be present in the digital component request) for which the digital component is eligible. In this example, MPC1 and MPC2 can identify eligible digital components by comparing the contextual data of the digital component request to the lookup key of each digital component in the data structure.

When the MPC cluster 130 receives a digital component request from a client device 110, each MPC computer of the MPC cluster 130 can identify a set of eligible digital components using the contextual data of the digital component request. The MPC cluster 130 can perform secure MPCs to select, from the eligible digital components, a digital component for each digital component slot of the digital component request using the candidate expressions and selection values for the digital components. The MPC cluster 130 can send a selection result for each selected digital component to the client device 110. As described in more detail below, the selection result for a digital component can be a secret share of the selected digital component or of data for the digital component, e.g., a secret share of the byte array for the digital component. The MPC cluster 130 can provide the secret shares of each selection result to the client device 110, where the application 112 can combine the secret shares to access each selected digital component in cleartext and present the digital component.

The device evaluator 180 is configured to evaluate client devices 110 to assign a level of trustworthiness to the client devices 110. The device evaluator 180 can be a server of a trusted device evaluation service provider. The device evaluator 180 can receive signals from the client device 110 that can be used in the evaluation. These signals can include any signals that can be used to assess whether the client device 110 is trustworthy, e.g., signals that can be used to distinguish between actual client devices being used by users from emulators or bots that generate fake user interactions and/or network traffic.

The device evaluator 180 can send device integrity elements to the client devices 110. A device integrity element can include the verdict of trustworthiness assigned to the client device 110 by the device evaluator 180. The verdict of trustworthiness can indicate a level of trustworthiness of the client device. The level of trustworthiness can be, for example, a classification, e.g., trustworthy or not trustworthy, or a value, e.g., between 1-3, 1-10, 1-100, or another appropriate range. As described below, the device integrity element can be in the form of a device integrity token.

Figure 2:
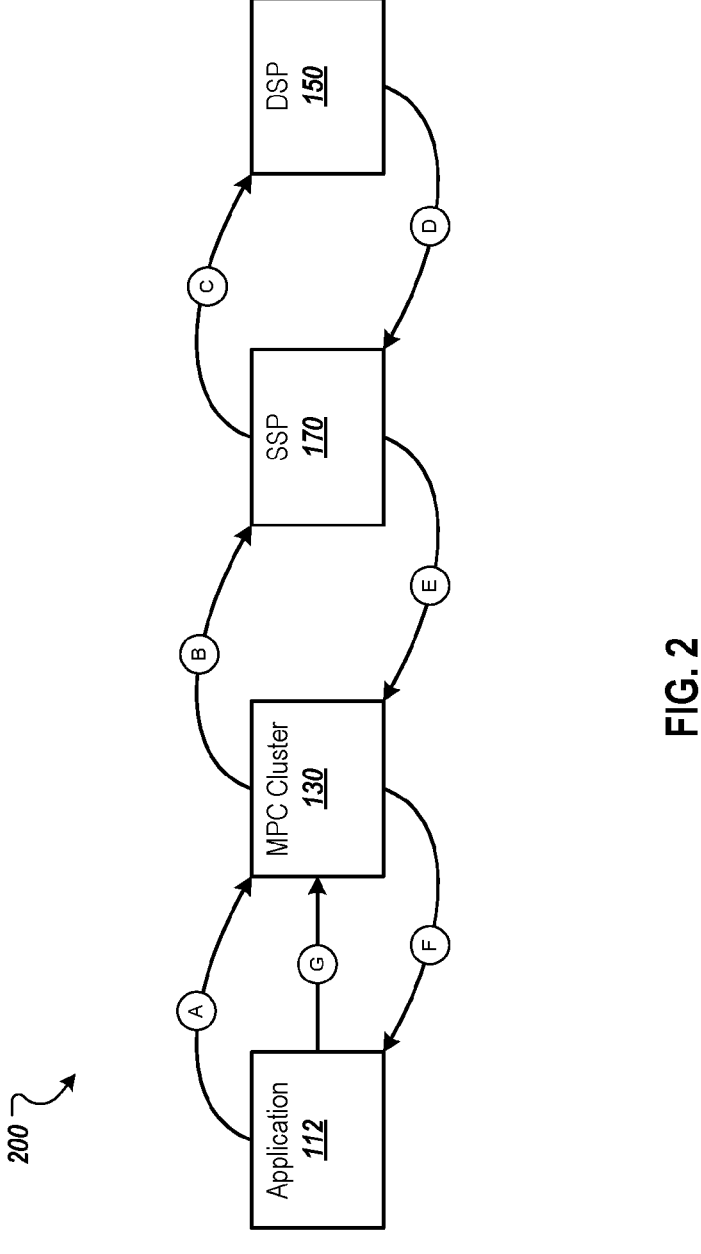
FIG. 2 is a data flow diagram of an example process for selecting a digital component for providing for display at or distribution to a client device.

FIG. 2 is a data flow diagram of an example process 200 for selecting a digital component for providing for display at or distribution to a client device. Operations of the process 200 can be implemented, for example, by the application 112 on client device 110, the MPC computers (e.g., MPC1 and MPC2) of the MPC cluster 130, and content platforms (e.g., DSP(s) 150 and SSP(s) 170). Operations of the process 200 can also be implemented as instructions stored on one or more computer readable media which may be non-transitory, and execution of the instructions by one or more data processing apparatus can cause the one or more data processing apparatus to perform the operations of the process 200. Although the process 200 and other processes below are described in terms of a two computing system MPC cluster 130, MPC clusters having more than two MPC computers can also be used to perform similar processes.

This description includes two types of selection values-selection values that are conditioned on either sensitive user information, such as user group, or parameters whose changes in value can allow unscrupulous parties to infer the sensitive information. These selection values can be referred to as "conditional selection values." Selection values that are not conditioned on sensitive information can be referred to as "unconditional selection values." The sensitive information can include, for example, user group membership information and/or client device location information.

This structure allows the MPC cluster 130 to protect user privacy and other confidential information, and to prove its trustworthiness to application providers, such as a provider of application 112, or Operating System developers. In this example, the MPC cluster 130 relies on secure 2-Party computation (2PC) architecture, which applies cryptography techniques to guarantee that, if at least one of the two computers of the MPC cluster 130 is honest, there is no leaking of confidential user data or other confidential information. If the MPC cluster 130 includes more than two computers, other MPC protocols can be used.

The MPC cluster 130 runs the secure 2PC protocol to evaluate and apply conditions to select eligible digital components in response to digital component requests received from client devices 110. As part of this secure 2PC protocol, the MPC cluster 130 can identify, as candidate digital components, which include digital components having conditional selection values for which each condition is satisfied and unconditional digital components. From the candidate digital components, the MPC cluster 130 can select a digital component based on the selection values for the digital components using the secure 2PC protocol.

The process 200 begins with stage A, in which application 112 sends a digital component request to the MPC cluster 130. The digital component request includes information used in a digital component selection process, including information that can be sensitive, such as identifiers of user groups to which the application 112 is mapped or otherwise associated (e.g., based on the user being a member of the user groups) and/or location information indicating a current location or historical location (if the user opts in to the use of historical location) of the client device that sent the digital component request.

The digital component request can also include information that is not classified as being sensitive, such as contextual data regarding the context in which the digital component will be presented. The contextual data can include, for example, data about the electronic resource with which the selected digital component will be presented, a spoken language of the client device 110 (e.g., a spoken language setting of the application 112 that defines the language in which text is displayed), and/or other appropriate contextual data. The data about the electronic resource can include, for example, a reference to the resource (e.g., a URL or Universal Resource Identifier (URI)) for the resource, the number of digital component slots of the resource, the topic of the resource, and/or other appropriate data about the resource.

As described herein, the design of system 100 improves the protection and security of user data that can be sensitive by using secret shares of sensitive information for each computing system of the MPC cluster 130 so that no single entity, including the MPC computers, other than the client device 110 has access to sensitive information in cleartext. For example, the client device 110 can split each piece of sensitive information into respective secret shares for the MPC computers of the MPC cluster 130. Each secret share is meaningless unless combined with its other corresponding secret share(s). In this way, absent unauthorized collusion between MPC1 and MPC2, no entity other than the client device 110 has access to any user group identifier for the user of the client device 110 or the current location of the client device 110 in cleartext.

In some implementations, to reduce bandwidth consumption and the client device's battery consumption, the client device 110 can send the secret shares for each MPC computer (e.g., MPC1 and MPC2) in the digital component request to one of the MPC computers (e.g., MPC1). To prevent MPC1 from accessing the secret shares designated for MPC2, the client device 110 can encrypt the secret shares for MPC2 using an encryption key (e.g., public key) of MPC2 such that only MPC2 can decrypt the secret shares using its decryption key (e.g., private key). MPC1 can send the secret shares intended for MPC2 to MPC2 so that MPC2 can decrypt the secret shares and use the decrypted secret shares in the digital component selection process.

The process 200 continues with stage B, in which the MPC cluster 130 transmits a contextual digital component request to an SSP 170. The contextual digital component request, which is also referred to as a contextual request for brevity, can contain contextual data, e.g., various contextual signals, received from the client device 110. For example, this contextual request can include any of the contextual data of the digital component request. The contextual request provided to SSP 170 does not, however, include sensitive information, such as user group identifiers or location information. In some implementations, the contextual request provided to SSP 170 can include first party user identifiers and/or other user data.

The process 200 continues with stage C, in which SSP 170 forwards the contextual request to one or more DSPs 150. Each DSP 150 stores digital components and selection values mapped to the digital components on behalf of digital component providers 160.

The process 200 continues with stage D, in which the DSPs 150 select and return selection values (or vectors for determining selection values) in response to the contextual request. Each DSP 150 can select the digital component(s) based on the contextual data of the contextual request. Each DSP 150 can return one or more selection values that are each mapped to a digital component responsive to the contextual request. DSP 150 can return any number of selection values and digital components responsive to the contextual request.

The process 200 continues with stage E, in which SSP 170 provides at least a portion of the digital components to the MPC cluster 130. In some implementations, SSP 170 filters some of the digital components and provides the filtered set of digital components to the MPC cluster 130. For example, SSP 170 can apply content selection rules to the digital components received from the DSP(s) 150. For example, SSP 170 applies rules such as content provider and digital component blocking rules that prevent particular content providers from being eligible to provide digital components and selection values, or particular digital components from being candidates. In some implementations, the application 112 can maintain a set of blocked identifiers that includes identifiers of digital components that have been expressly blocked by the user and block digital components that have the identifier from being sent to the MPC cluster 130 for digital component selection processes that are performed to select digital components for distribution to the user's client device 110. SSP 170 can be configured to perform other appropriate filtering processes, e.g., specific by users and/or publishers.

The process 200 continues with stage F, in which the MPC cluster 130 performs secure MPC processes to select a digital component in response to the digital component request. The MPC computers MPC1 and MPC2 of the MPC cluster 130 can collaborate to perform secure computations using the secure 2PC protocol to select a digital component and generate respective secret shares of a selection result that references and/or includes the selected digital component. For example, the cleartext selection result can either include the selected digital component, e.g., the creative that is presented at the client device 110, or a URL or other reference to a network location from which the digital component can be obtained, e.g., downloaded.

For example, as the result of the selection process for a digital component request, MPC1 can hold (e.g., store temporarily) a first secret share of the selection result and MPC2 can hold a second secret share of the selection result. Each MPC computer can provide its secret share of the selection result to the application 112. To reduce bandwidth consumption and client device battery use, one of the MPC computers (e.g., MPC1) can provide a composite result that includes a first secret share of the selection result held by MPC1 and an encrypted second secret share of the selection result held by MPC2 (encrypted using an encryption key of the client device 110 such that the client device 110 can decrypt the second secret share of the selection result).

The process 200 continues with stage G, in which the application 112 presents the selected digital component. As the selection results are in secret shares, application 112 can first combine the first secret share of the selection result with the second secret share of the selection result to obtain the selection result in cleartext. For example, if the 2PC protocol uses additive secret sharing, the application 112 can add the two secret shares together to obtain the selection result in cleartext. In a particular example, the selection result can include the digital component information element for the selected digital component. The digital component information element is a byte array that includes the digital component or a reference to the digital component and optionally other metadata for the digital component. In this example, the application 112 can combine the secret shares of this byte array to obtain the byte array in clear text and then process the byte array to obtain the selected digital component.

The application 112 can then present the digital component with the electronic resource. The application 112 can also provide an impression notification to the MPC cluster 130. This impression notification includes data that allows the MPC cluster 130 to update information relevant to counters that allow the MPC cluster 130 to enforce conditions described herein.

Figure 3:
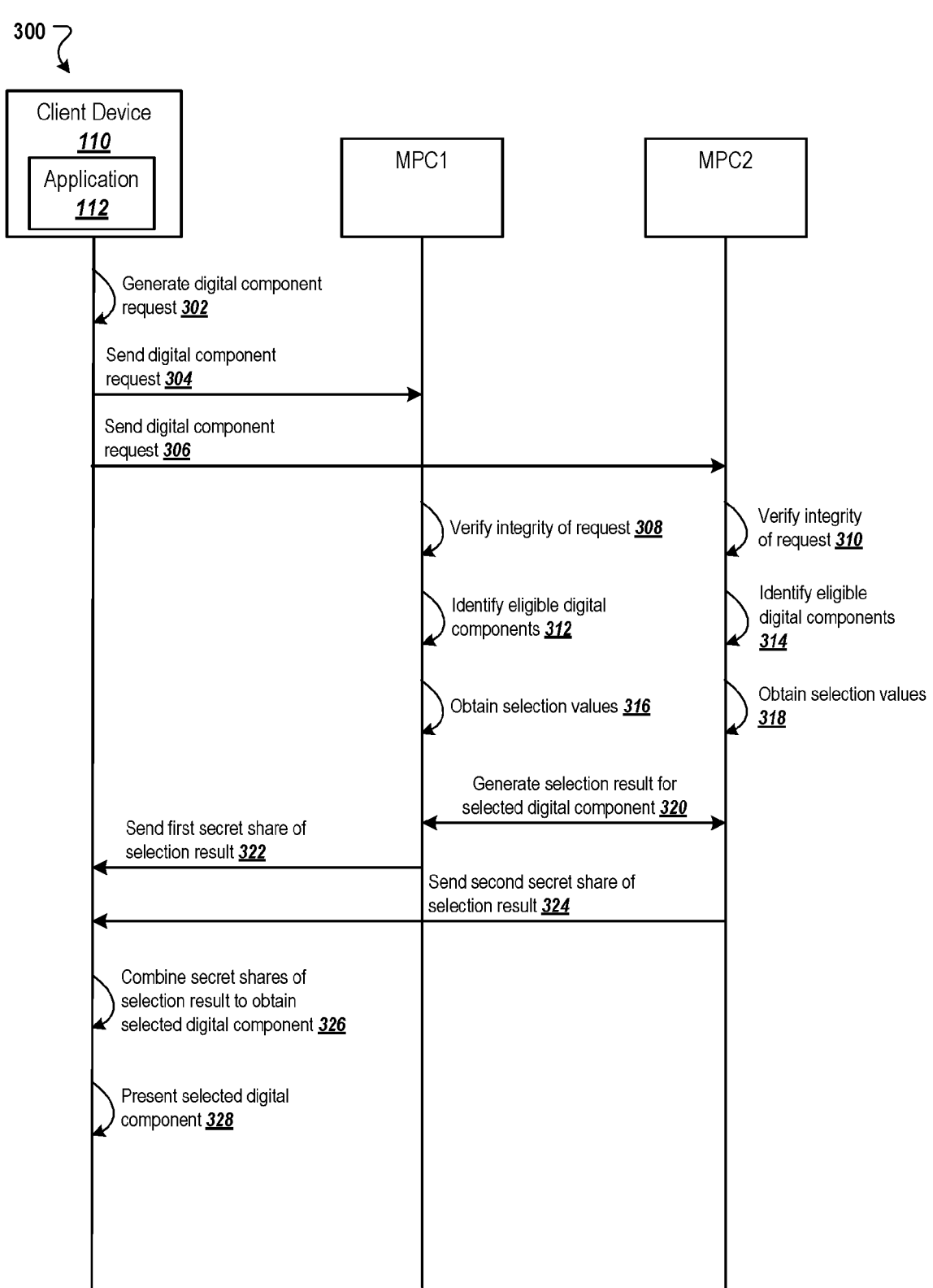
FIG. 3 is a swim lane diagram of an example process for selecting and distributing a digital component to a client device.

FIG. 3 is a swim lane diagram of an example process 300 for selecting and distributing a digital component to a client device 110. Operations of the process 300 can be implemented, for example, by the client device 110 and the MPC computers (e.g., MPC1 and MPC2) of the MPC cluster 130. Operations of the process 300 can also be implemented as instructions stored on one or more computer readable media which may be non-transitory, and execution of the instructions by one or more data processing apparatus can cause the one or more data processing apparatus to perform the operations of the process 300. Although the process 300 and other processes below are described in terms of a two computer MPC cluster 130, MPC clusters having more than two computing systems can also be used to perform similar processes.

An application 112 running on the client device 110 generates a digital component request (302). The application 112 can generate the digital component request to request a digital component for presentation with a resource that is being presented or loaded for presentation by the application 112. For example, the application 112 can process code, e.g., scripts, of a digital component slot and the code can cause the application 112 to generate the digital component request.

As described above, a digital component request can include contextual data, user group membership information (e.g., one or more user group identifiers that identify users groups that include a user of the application 112 as a member), and/or location information that indicates a current location of the client device 110. The location information can be in the same form as the keys of the lookup table maintained by MPC1 and MPC2. For example, the location information can be an IP address (or a portion of the IP address related to location) or an S2 cell identifier for the current location of the client device 110. The client device 110, or the application 112 or a trusted program running on the client device 110, can determine the S2 cell identifier corresponding to the raw coordinates (e.g., latitude and longitude coordinates) of the client device 110.

As the user group membership information and location information can be sensitive, the application 112 can split the user group membership information and the location information into respective secret shares for the MPC computers MPC1 and MPC2. For example, the application 112 can generate a first digital component request for MPC1 and a second digital component request for MPC2. The first digital component request can include the contextual data and first secret share(s) of the user group membership information and/or a first secret share(s) of the location information. Similarly, the second digital component request can include the contextual data and second secret share(s) of the user group membership information and/or a second secret share(s) of the location information.

In some implementations, the application 112 can generate a composite request that includes the first secret shares intended for MPC1 and encrypted second secret shares intended for MPC2. The second secret shares can be encrypted using an encryption key (e.g., a public key) of MPC2 so that only MPC2 can decrypt the second secret shares using a corresponding decryption key (e.g., private key).

Various types of secure MPC protocols and associated secret sharing techniques can be used to generate the secret shares of the user group membership information and/or the location information. For example, additive secret sharing or XOR secret sharing can be used. In additive secret sharing, the secret shares of secret data are added together, e.g., using (a1+a2) mod p where the secret shares are a1 and 12, to obtain the secret data in cleartext. In XOR secret sharing, the secret shares are XORed together (e.g., using bitwise XOR) to obtain the secret data in cleartext. XOR secret shares can be reconstructed using (a1+a2) mod p, where p have a value of two. In some implementations, as described below, distributed point functions can also be used to generate the secret shares and evaluate the secret shares using a secure MPC protocol.

Each digital component request can include an attestation token or be in the form of an attestation token. The attestation tokens provide a secure channel using digital signature techniques to enable the detection of data manipulation and to ensure that the attestation token is sent from the purported sender.

The attestation token can include a set of data that includes payload data, a timestamp that indicates a time at which the attestation token is generated, and a public key of the client device (or of an application running on the client device that generates and sends the message). The attestation token can also include a digital signature generated using the payload data and a private key corresponding to, e.g., linked to the public key. For example, the public key and private key can be asymmetric encryption keys that are mathematically linked.

The payload data can include the contextual data, the secret share(s) of the user group membership information, and/or the secret share(s) of the location information. In some implementations, the contextual data and/or the user group membership data can be sent outside of the protection of the attestation token, e.g., as a separate part of the request. By including the location information in the attestation token, the MPC cluster 130 can ensure that the location information was sent by the client device 110 that purports to send the attestation token and that the location information has not been modified after the attestation token was generated. As described in more detail herein, e.g., with reference to FIG. 5, the attestation token can include a device integrity element that includes a verdict of trustworthiness that indicates whether the client device 110 and/or application 112 are trustworthy. This enables the MPC cluster 130 to ensure that the location information originates from a trustworthy device rather than an emulator or bot of a malicious actor.

When a digital component request includes user group membership information, the application 112 can use probabilistic data structures (e.g., cuckoo filters or Bloom filters) to send the secret shares of the user group identifiers. The application 112 can populate the probabilistic data structure based on the user groups that include the user as a member, e.g., using hash functions. This enables the MPC cluster 130 to query the probabilistic data structure using the hash functions to determine which user groups include the user as a member. The probabilistic data structures are compact representations of a group of data, which reduces the battery consumption of client devices 110 that send the user group membership information and the amount of consumed bandwidth to transmit the user group membership information across the network 105. The application 112 can generate and include a first secret share of the probabilistic data structure in the first digital component request and a second secret share of the probabilistic data structure in the second digital component request. These secret shares can be XOR secret shares.

The application 112 sends the first digital component request to MPC1 (304). Similarly, the application 112 sends the second digital component request to MPC2 (306).

MPC1 verifies the integrity of the first digital component request (308). For example, MPC1 can verify the integrity of the attestation token used to send the request or included in the request. This verification can include multiple integrity checks. An example process for verifying the integrity of an attestation token is described with reference to FIG. 5.

MPC2 also verifies the integrity of the second digital component request (310). MPC2 can perform the same evaluation as MPC1, including verifying the integrity of the attestation token using the process described with reference to FIG. 5.

MPC1 identifies eligible digital components that are eligible to be selected in response to the digital component request (312). An eligible digital component is a digital component that is eligible for selection based on contextual conditions for the digital component. MPC1 can compare the contextual data of the digital component request to the contextual conditions for a digital component to determine whether the digital component is eligible. MPC1 can identify the eligible digital components from a set of digital components that includes stored digital components stored by MPC1 and any digital components received from an SSP 170 in response to a contextual request sent to the SSP 170, as described with reference to FIG. 2.

MPC2 identifies eligible digital components that are eligible to be selected in response to the digital component request (314). MPC2 can perform the same process as MPC1 to identify eligible digital components. As the digital component information stored by each MPC computer should be the same, both MPC computers should identify the same eligible digital components.

MPC1 obtains selection values for the eligible digital components (316). Each digital component is linked to a selection value or a vector of values that can be used to determine the selection value. The vector can be a user group-based vector including multiple elements across two or more dimensions and each element can represent a particular feature of a digital component presentation opportunity. For example, the user group-based vector of values can include elements for spoken languages, ages or age ranges, particular URLs of web pages or other electronic resources, particular products or services, whether a digital component slot is above or below the fold, the type of digital component slot, the size of the digital component slot, the number of digital component slots on the electronic resource, the time of day, web property identifier, and/or other appropriate features of digital component presentation opportunities. The vector can be in embedding space, in which each dimension may not have obvious semantics.

Each user group-based vector can be specific to a particular user group. That is, the values of the user group-based vector can be for use when the digital component is being considered for selection for users of a particular user group. Each user group-based vector can be mapped to its corresponding user group identifier. That is, the MPC computers of the MPC cluster 130 can store the user group-based vector for a digital component in a way that links the user group-based vector to the digital component so that the user group-based vector can be used in subsequent digital component selection processes.

To determine the selection value for a digital component, MPC1 can compute a dot product of the user group-based (or other user signals that might be privacy sensitive) vector for the digital component and a contextual vector for the digital component. The contextual vector can be received from a DSP 150 in response to a contextual request that is sent by the MPC cluster 130 in response to the digital component request for which a digital component is currently being selected. This enables the DSP 150 to control the selection value based on the contextual data of the current digital component request. The contextual vector can include the same structure as the user group-based vector, e.g., with the same elements.

MPC2 obtains selection values for the eligible digital components (318). MPC2 can obtain the selection values using the same process as MPC1.

MPC1 and MPC2 execute a secure MPC protocol that includes secure MPCs to generate a selection result that includes data identifying a selected digital component (320). The selected digital component can be selected from the eligible digital components based on the conditions for the digital components and/or the selection values for the digital components.

For example, as part of the secure MPC digital component selection process, the MPC computers can generate, based on the conditions, secret shares of candidate parameters for each digital component. The candidate parameter for a digital component indicates whether the digital component is a candidate for selection. In other words, the candidate parameter for a digital component can indicate whether all of the conditions for the digital component are satisfied.

The conditions for a digital component can be in the form of a candidate expression. The candidate expression can be a Boolean expression with one or more conditions. For example, a candidate expression for a digital component can be that the current location of the client device 110 matches a geographical area of a particular geographic category identifier and that the user of the client device 110 has not muted the digital component. Another example candidate expression can be that the current location of the client device 110 does not match any geographical area of a particular geographic category identifier and the user is a member of a particular user group. Another example candidate expression can be that the previous locations of client device 110 correspond to one or more geographic category identifiers (e.g., previous locations include identifier A OR identifier B). Any combination of conditions described herein can be used in any combination in a candidate expression for a digital component.

The candidate expression for a digital component can include a set of candidate parameters and Boolean operators. For example, the candidate expression can include a Boolean operator between a pair of candidate parameters or that otherwise applies to multiple candidate parameters (e.g., a logical AND operation for two or more candidate parameters). A candidate expression can include a Boolean operator that operates on a single candidate parameter, e.g., a logical NOT operator that negates a candidate parameter. The candidate expression result can be split into secret shares such that each MPC computer MPC1 and MPC2 has a secret share of the candidate expression result and maintains a secret share of the value of each candidate parameter in the candidate expression. An example candidate expression can be in the form of Relationship 1 below:

$$\text{Candidate}_i = cp_1 \ OP_1 \ cp_2 \ OP_2 \ ... \ OP_N \ cp_N \qquad (1)$$

In Relationship 1, if $\text{Candidate}_1$ evaluates to a value of True, the digital component i is a candidate for selection in the current selection process. Each candidate parameter is represented by $cp_i$ and each Boolean operator is represented by $OP_i$. The candidate expressions for digital components are flexible and can have differing numbers of candidate parameters and Boolean operators, including Boolean operators that apply to multiple candidate parameters and/or Boolean operators that apply to a single candidate parameter. A secret share of the candidate expression is shown in Relationship 2 below:

$$[\text{Candidate}_i]_1 = [cp_1]_1 \ OP_1 \ [cp_2]_1 \ OP_2 \ ... \ OP_N \ [cp_N]_1 \qquad (2)$$

Parameters appearing in brackets represent secret shares of the variable within the brackets. The subscript outside the brackets indicate the number of the secret share. In this example, the number "1" indicates that these are secret shares held by MPC1. The secret share of the candidate expression held by MPC2 would include a subscript of "2" outside the brackets to represent the second secret share of each candidate parameter.

For the first digital component slot, MPC1 and MPC2 can compute the secret shares of each candidate parameter for each eligible digital component having a candidate expression. As an example, if a digital component has a condition that specifies that it is eligible for display to users in one or more user groups, the candidate expression for the digital component can include a user group parameter. If the user is a member of the user group, the user group parameter would have a value of True. MPC1 and MPC2 can determine whether the user is a member of the user group based on the secret shares of the user group identifiers received in the digital component request and the user group(s) corresponding to the digital component, e.g., using a secure MPC process. This results in MPC1 storing a first secret share of the user group parameter and MPC2 storing a second secret share of the user group parameter. In this way, neither MPC computers can access the user group membership of the user in cleartext.

MPC1 and MPC2 can perform secure MPCs using the secret shares of the candidate parameters to evaluate the candidate expressions. At the end of these operations, MPC1 stores, for each candidate expression, a first secret share of whether the candidate expression is satisfied (e.g., whether $\text{Candidate}_i$ is True) and MPC2 stores, for each candidate expression, a second secret share of whether the candidate expression is satisfied.

In some implementations, the MPC computers use garbled circuits to generate the secret shares of the candidate parameters for each eligible digital component. For example, MPC1 can act as the garbler and generate a garbled circuit using the candidate expression for each eligible digital component and send the garbled circuit to MPC2. MPC2 can act as the evaluator and evaluate the garbled circuit. The construction and evaluation of the garbled circuit results in each MPC computer having a secret share of the candidate parameter for each digital component. MPC1 can generate the garbled circuit based on the location of the client device, a table of geographic location identifiers, for each geographic location identifier, one or more geographical areas corresponding to the geographic location identifier, and the candidate expression for each of the digital components (or each eligible digital component).

After generating the secret shares of the candidate parameters, the MPC computers can select a digital component from the candidates using the secure MPC protocol such that neither MPC computer knows which digital components are candidates. To do so, MPC1 and MPC2 can each determine an order of the digital components based on the selection values. These two orders should be exactly the same because the input to the ordering process is the same at MPC1 and MPC2. Each of MPC1 and MPC2 can determine an order of the digital components. The order can be from the digital component having the highest selection value to the digital component having the lowest selection value.

As the selection values are in cleartext, MPC1 and MPC2 do not have to perform any roundtrip computations to determine the order of the digital components. Instead, MPC1 and MPC2 can each order the selection values independently. If the selection values were stored as secret shares at MPC1 and MPC2, with each of MPC1 and MPC2 having a respective secret share of each selection value, MPC1 and MPC2 can perform a secure MPC process using roundtrip computations to order the selection values. If there is a tie between two or more selection values, MPC1 and MPC2 can break the tie deterministically using other metadata for the digital components corresponding to these selection values.

MPC1 and MPC2 can then determine secret shares of a rank value $rank_i$ for each candidate digital component. The rank value for a given digital component indicates whether there are any candidate digital components that have a higher selection value than the given digital component. The rank value for a digital component can be True or False. The digital component is the selected digital component if the rank value is False and the digital component is a candidate.

MPC1 and MPC2 then determine secret shares of a winner parameter $is\_dc\_the\_winner_i$ for each digital component i. MPC1 and MPC2 can determine the winner parameters $is\_dc\_the\_winner_i$ based on, for each digital component i, the secret shares of the rank value $rank_i$ and the secret shares of the candidate parameter $Candidate_i$ for each digital component i. The winner parameter $is\_dc\_the\_winner_i$ for each digital component i can be a Boolean value that indicates whether the digital component i is the winner of the selection process, e.g., whether the digital component i is selected for distribution to the client device 110 in response to the digital component request.

In some implementations MPC1 and MPC2 can perform operations of the secure MPC protocol to calculate, for each selection value, the winner parameter $is\_dc\_the\_winner_i$= (Candidate$_i$ AND (rank$_i$==False)) in terms of secret shares. The equality operation for the comparison between rank and False is equivalent to "NOT rank" and can be computed for free in a garbled circuit implementation. At the end of these secure computations, computing system MPC1 has one secret share of the result $is\_dc\_the\_winner_i$ represented as $[is\_dc\_the\_winner_{i,1}]$=$[Candidate_{i,1}]$ AND ($[rank_{i,1}]$===False). Similarly, computing system MPC2 has the other secret share of the result $is\_dc\_the\_winner_i$ represented as $[is\_dc\_the\_winner_{i,2}]$=$[Candidate_{i,2}]$ AND ($[rank_{i,2}]$== False). Note that for all digital components, at most one digital component has a winner parameter $is\_dc\_the\_winner_i$ that is equal to one or True, which is the digital component that is selected for distribution to the client device 110. All others would equal zero or False.

MPC1 and MPC2 can then determine a selection result. In some implementations, MPC1 and MPC2 can calculate the selection result based on the winner parameters for the digital components and the digital component information element (dc_information_element) for the digital components. As described above, the digital component information element dc_information_element for a digital component can include the digital component itself (or a reference to the digital component) and optionally other data for the digital component.

Conceptually, MPC1 and MPC2 can calculate the selection result parameter "result" using Relationship 3 below:

$$result = \sum_i is\_dc\_the\_winner_i \times dc\_information\_element_i \quad (3)$$

That is, MPC1 and MPC2 can determine, across all of the digital components, the sum of the products of the winner parameter is dc the winner$_i$ and the digital component information element $dc\_information\_element_i$. In this example, the selection result will either have a value of zero (or False) if there are no candidate digital components or will have a value equal to the digital component information element dc_information_element of the selected digital component that has a winner parameter $is\_dc\_the\_winner_i$ that is equal to one (or True). In another example, the digital component information element dc_information_element can be replaced in each relationship (e.g., Relationship 3 and Relationships 4 and 5 below) with the selection values for the digital components. In this example, the selection result will either have a value zero (or False) if there are no candidate digital components or will have a value equal to the selection value of the selected digital component that has a winner parameter $is\_dc\_the\_winner_i$ that is equal to one (or True). In another example, the digital component information element dc_information_element can be replaced in each relationship with the URL for downloading the digital components.

To perform the calculation in secret shares, MPC1 takes all of the digital components and multiplies the digital component information element $dc\_information\_element_i$ for the digital component, which can be in cleartext, by the first secret share of the winner parameter $[is\_de\_the\_winner_{i,1}]$ for the digital component. The computing system MPC1 can then determine the sum of these products and return the sum to the client device 110 that submitted the digital component request. That is, computing system MPC1 can determine, as a first secret share $[result_1]$ of the result, the sum using Relationship 4 below:

$$[result_1] = \sum_i ([is\_dc\_the\_winner_i] \times dc\_information\_element_i) \quad (4)$$

MPC2 can perform a similar calculation to determine the second secret share $[result_2]$ of the result using Relationship 5 below:

$$[result_2] = \sum_i ([is\_dc\_the\_winner_i] \times dc\_information\_element_i) \quad (5)$$

In some implementations, the performance of the MPC cluster 130 can be improved by replacing multiplications performed in secret shares with bitwise AND operations and replacing summations with bitwise XOR operations. This can eliminate the need for roundtrip operations to perform these computations.

At the end of these computations, MPC1 holds a first secret share of the selection result and MPC2 holds a second secret share of the selection result. The selection result can include the selected digital component or a reference to the selected digital component. The reference to the selected digital component can include a URL of a network location from which the selected digital component can be downloaded. The selection result can be the digital component information element for the selected digital component.

MPC1 sends the first secret share of the selection result to the client device 110 (322). Similarly, MPC2 sends the second secret share of the selection result to the client device 110 (324). In some implementations, MPC1 can send a composite result that includes the first secret share of the selection result and an encrypted version of the second secret share of the selection result. For example, MPC2 can encrypt the second secret share of the selection result using an encryption key (e.g., public key) of the client device 110 and provide the encrypted second secret share to MPC1.

This prevents MPC1 from accessing the selection result and therefore the selected digital component in cleartext. Sending a composite request can reduce bandwidth consumption and client device battery consumption.

The application 112 combines the secret shares of the selection result (326). The application 112 can obtain the selection result in cleartext by combining the secret shares of the selection result. If the selection result includes the selected digital component, the application 112 can access the digital component in cleartext. If the selection result includes a URL for downloading the selected digital component, the application 112 can download the selected digital component using the URL.

The application 112 presents the selected digital component (328). For example, the application 112 can display the digital component in a digital component slot of an electronic resource, e.g., the digital component slot that caused the application 112 to request a digital component from the MPC cluster 130.

In some implementations, the MPC cluster 130 preprocesses the lookup table for the geographic category identifiers prior to performing the process 400. Based on the permissible false positive rate (FPR) and the average number of geographic category identifiers for each key, the MPC cluster 130 defines the parameters for a Bloom filter. For each value in the lookup table, the MPC cluster 130 creates a Bloom filter and inserts all geographic category identifiers in the value to the Bloom filter. The MPC cluster 130 then serializes the Bloom filter into a byte array. Because all Bloom filters share the same settings, all Bloom filters created will serialize into byte arrays of the same length. At digital component selection time, the MPC cluster 130 can consider the values contained in the lookup table as byte arrays of equal length. The lookup table creation process does not depend on any sensitive user data. Therefore, the process can be performed periodically and the versioned result can be distributed to all parties in the MPC cluster 130 offline.

If there are not many geographic category identifiers, or if the false positive rate should be low, the Bloom filter can be replaced with a bit array. The bit array can include one bit per geographic category identifier and the value of the bit can represent whether the client device is in a geographic area of the geographic category identifier.

In some implementations, the secret shares of the location information are generated using distributed point functions. In this example, the application 112 generates respective distributed point functions for the MPC computers based on the location information that indicates the current location (or a previous location if permitted by the user) of the client device 110. For each key in the lookup table for the geographic category identifiers, each MPC computer evaluates its distributed point function to determine whether it matches one or more geographic areas corresponding to the geographic category identifier. The evaluation result is the private information retrieval (PIR) mask. The result computed by the i-th MPC computer is the XOR result of all lookup table values whose key corresponds to the PIR mask of one (instead of zero). In other words, the i-th MPC computer computes the PIR result $L_i$ using Relationship 6 below:

$$L_i = \sum_j \text{value}_j \text{ where } DPF_i(\text{key}_j == 1) \qquad (6)$$

In Relationship 6, the summation represents a bitwise XOR operation among all elements by the i subscription. The bitwise XOR of the PIR result $L_i$ for all MPC computers in the MPC cluster 130 equals to the byte array serialized from the Bloom filter that contains all geographic category identifiers corresponding to the current location of the client device 110. Therefore, the PIR result $L_i$ is the Bloom filter in XOR secret share representation.

To reduce the computations and reduce latency in distributing digital components to client devices 110, the PIR result $L_i$ can be sent to the client device 110 for caching. The client device 110 can send this PIR result $L_i$ to the MPC cluster 130 with subsequent digital component requests. As the PIR result $L_i$ represents matches between the client device location and geographic category identifiers, the MPC cluster 130 may need to generate a new PIR result $L_i$ when the location of the client device 110 changes. For example, the client device 110 can be configured to delete the PIR result $L_i$ in response to the location changing by at least a threshold amount.

When caching is used, the client device 110 can also be configured to store a PIR result $L_i$ for each domain and only send the PIR result $L_i$ for a domain when the client device 110 is requesting a digital component to display with a resource from that domain. This can prevent any cross-domain information from being accessible by the MPC computers or any other entity.

Figure 4:
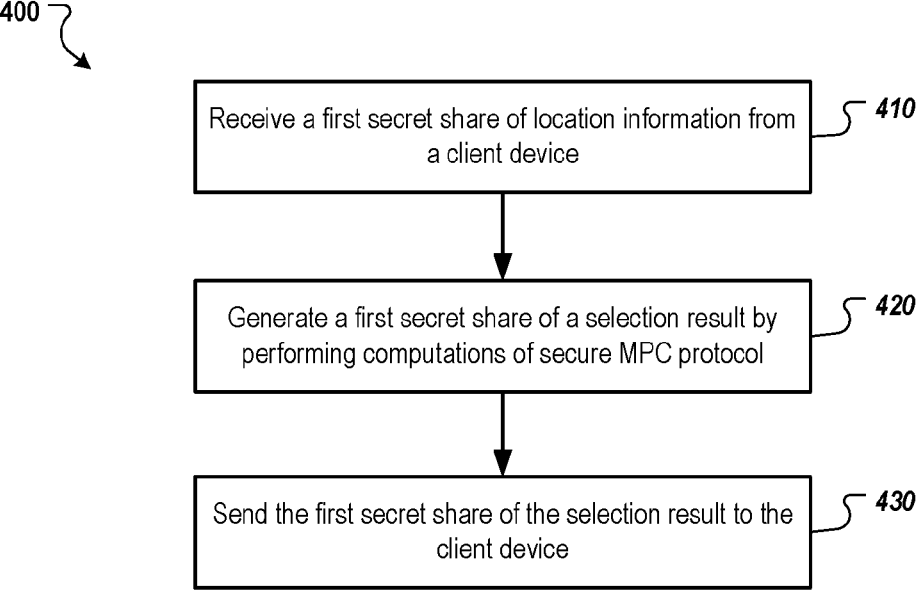
FIG. 4 is a flow diagram of an example process for selecting and distributing a digital component to a client device.

FIG. 4 is a flow diagram of an example process 400 for selecting and distributing a digital component to a client device 110. Operations of the process 400 can be implemented, for example, by a first MPC computer (e.g., MPC1) in collaboration with one or more second MPC computers (e.g., MPC2) of an MPC cluster 130 that execute a secure MPC protocol to select digital components for distribution to client devices 110. Operations of the process 400 can also be implemented as instructions stored on one or more computer readable media which may be non-transitory, and execution of the instructions by one or more data processing apparatus can cause the one or more data processing apparatus to perform the operations of the process 400.

A first secret share of location information is received from a client device 110 (410). MPC1 can receive a digital component request that includes a first secret share of the location information. The location information can indicate a current location of the client device 110 or, if permitted by the user, one or more previous locations of the client device 110. MPC1 can receive a first secret share of location information for each of the previous locations. As described herein, the first secret share of the location information can be included in an attestation token. The client device 110 can also send respective second secret shares of the location information to each second MPC computer of the MPC cluster 130. These secret shares can also be sent using attestation tokens.

A first secret share of a selection result is generated (420). MPC1 can collaborate with the second MPC computer(s) to execute a secure MPC protocol to select a digital component based at least in part on the secret shares of the location information and, as a result of the secure computations, generate secret shares of the selection result. For example, the MPC computers can perform operations of the process 300 described with reference to FIG. 3 to generate the secret shares of the selection result. The selection result can include data identifying the selected digital component. For example, the selection result can include the digital component or a reference to the digital component. The reference to the digital component can include a URL for a network location from which the digital component can be downloaded. Each MPC computer of the MPC cluster 130 has a secret share of the selection result at the end of the selection process. For example, MPC1 can have a first secret share of the selection result and each second MPC computer has a respective second secret share of the selection result.

The first secret share of the selection result is sent to the client device 110 (430). MPC1 can send the first secret share of the selection result to the client device 110. Similarly, each second MPC computer can send its respective second secret share of the selection result to the client device 110. As described above, MPC1 can send a composite result that includes the first secret share of the selection result and an encrypted second secret share received from each second MPC computer.

Figure 5:
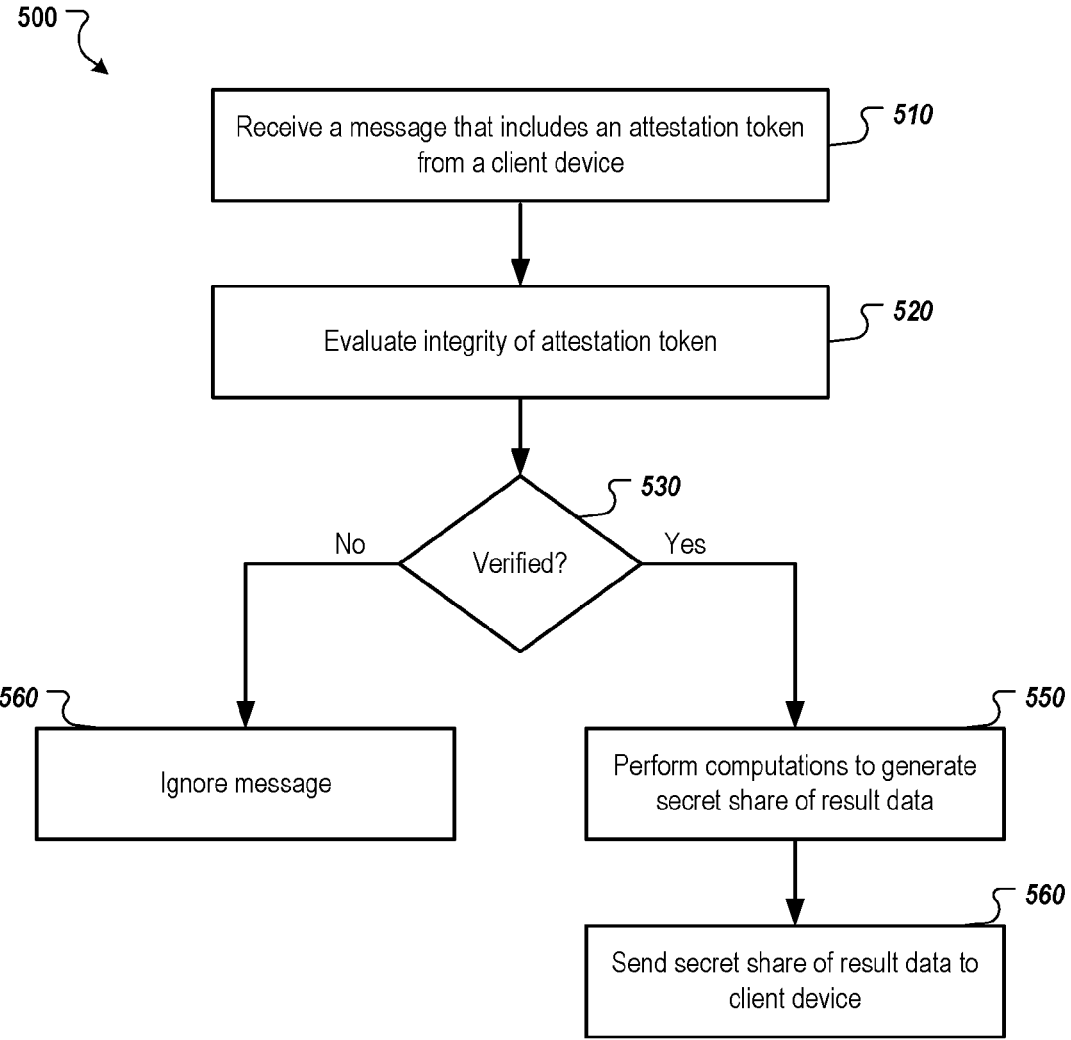
FIG. 5 is a flow diagram of an example process for verifying integrity of an attestation token and performing computations using a secret share of secret data included in the attestation token.

FIG. 5 is a flow diagram of an example process 500 for verifying integrity of an attestation token and performing computations using a secret share of secret data included in the attestation token. Operations of the process 500 can be implemented, for example, by an MPC computer, e.g., MPC1 and/or MPC2, of the MPC cluster 130. Operations of the process 500 can also be implemented as instructions stored on one or more computer readable media which may be non-transitory, and execution of the instructions by one or more data processing apparatus can cause the one or more data processing apparatus to perform the operations of the process 500.

A message that includes an attestation token is received from a client device (510). MPC1 can receive the request from the client device. The message can include a request to perform computations using secret data. For example, the message can include a request to select one or more digital components for display at the client device based on the current location of the client device, which can be the secret data. In another example, the message can include training data for training a machine learning model. In this example, the training data can be the secret data. For example, the MPC cluster 130 can execute a secure MPC protocol to train a machine learning model based on secret data received from multiple client devices.

The attestation token received by MPC1 can include a first secret share of the secret data. The first secret share of the secret data can be included in payload data of the attestation token. As described below, a respective second secret share of the secret data can be sent to each other MPC computer of the MPC cluster 130.

The attestation token can include a set of data that includes the payload data, a timestamp that indicates a time at which the attestation token is generated, and a public key of the client device (or of an application running on the client device that generates and sends the message). The attestation token can also include a digital signature generated using the payload data and a private key corresponding to, e.g., linked to the public key. For example, the public key and private key can be asymmetric encryption keys that are mathematically linked.

The client device can generate a digital signature of the payload data using the private key and an asymmetric cryptographic algorithm. The digital signature enables a recipient of the attestation token to verify that the content of the attestation token is the same as it was when the attestation token was generated. This enables the recipient to detect if a malicious actor has modified the content after the attestation token was generated, which enables fraud prevention. The client device can use an Elliptic Curve Digital Signature Algorithm (ECDSA) to generate the digital signature, but other signature techniques (e.g., RSA) can also be used. As described above, a trusted program of the client device generates the attestation token, including generating the digital signature.

The payload data of the attestation token can also include a device integrity element that includes a verdict of trustworthiness for the client device that sends the attestation token. The device integrity element can be issued by a device evaluator, e.g., the device evaluator 180 of FIG. 1. As described above, the device evaluator 180 can assign a verdict of trustworthiness to the client device based on signals received from the client device. The verdict of trustworthiness can indicate a level of trustworthiness of the client device. The level of trustworthiness can be, for example, a classification, e.g., trustworthy or not trustworthy, or a value, e.g., between 1-3, 1-10, 1-100, or another appropriate range.

The device integrity element can be in the form of a device integrity token. The device integrity token can include a similar structure as the attestation token, but with different payload data. For example, the device integrity token can include a set of data that includes payload data, a timestamp that indicates a time at which the device integrity token is generated, and a public key of the device evaluator. The payload data can include the verdict of trustworthiness of the client device. The device integrity token can also include a digital signature generated using the payload data of the device integrity token and a private key corresponding to the public key of the device evaluator. This enables a recipient of the device integrity token to verify that the content of the device integrity token is the same as it was when the device integrity token was generated.

The client device generates the attestation token with the device integrity token as part of the payload data of the attestation token. In this way, the device integrity token is bound to the attestation token and therefore to the client device that generates the attestation token. Thus, a different device integrity token could not be inserted into the attestation token without breaking the digital signature of the attestation token.

In some implementations, the device integrity element includes a verdict of trustworthiness for an application of the client device, e.g., in addition to or in place of the verdict of trustworthiness for the client device. The device evaluator 180 or an application evaluator can evaluate signals related to the application and generate the verdict of trustworthiness for the application based on the evaluation. The verdict of trustworthiness for the application can indicate a level of trustworthiness of the application. The level of trustworthiness can be, for example, a classification, e.g., trustworthy or not trustworthy, or a value, e.g., between 1-3, 1-10, 1-100, or another appropriate range. In some implementations, the device evaluator 180 can include a cryptographic hash of the application package or application binary in the application integrity element, where the cryptographic hash uniquely identifies the application to entities who receive the application integrity element.

In some implementations, the attestation token includes both a device integrity element, e.g., a device integrity token, that includes a verdict of trustworthiness for the client device, and an application integrity element, e.g., an application integrity token, that includes a verdict of trustworthiness for the application. The application integrity token can have the same structure as the device integrity token, but with a verdict of trustworthiness for the application rather than the client device.

The client device can also send a similar message to each other MPC computer of the MPC cluster 130, e.g., to MPC 2. The message for each MPC computer can include an attestation token, similar to the attestation token received by MPC1. However, the secret share of the secret data can be different for each MPC computer. For example, the client device can split the secret data into respective secret shares for the MPC computers such that neither MPC computer can access the secret data in cleartext absent unauthorized collusion between the MPC computers. To obtain the cleartext of the secret data, the secret shares would need to be combined, e.g., added together if additive secret sharing techniques are used.

The integrity of the attestation token is evaluated (520). MPC1 can evaluate the integrity of the attestation token based on the digital signature of the attestation token, the timestamp of the attestation token, and/or the integrity of the device integrity token. For example MPC1 can perform multiple integrity checks to verify the integrity of the attestation token.

One integrity check can include MPC1 determining whether the digital signature is valid using the set of data of the attestation token using the asymmetric encryption algorithm used to generate the digital signature and the set of data. If the signature is not valid, this indicates that the content of the attestation token does not match the content of the attestation token when the attestation was generated and the digital signature was generated.

Another integrity check can include determining whether the time indicated by the timestamp of the attestation token is within a threshold duration of a current time at which the attestation token is evaluated. If not, the attestation token can be considered stale, which can mean that the attestation token is a duplicate of an older token being used as part of a replay attack, or the integrity status contained in the attestation token may no longer be valid.

Another integrity check can include determining whether the verdict of trustworthiness of the client device indicates that the client device is trustworthy. For example, MPC1 can compare the classification or value indicated by the verdict of trustworthiness to classifications or threshold values that represent trustworthiness. In a particular example, a range of 1-10 can be used and the threshold may be 7. If the verdict of trustworthiness for the client device is at least 7, MPC1 can determine that the client device is trustworthy.

Another integrity check can be evaluating the integrity of the device integrity token if the device integrity element is in the form of a device integrity element. This check can be similar to the evaluation of the attestation token, e.g., including a signature check and a timestamp check. If an application integrity token is included in the attestation token, MPC1 can evaluate the application integrity token in a similar manner.

A determination is made whether the integrity of the attestation token is verified successfully (530). MPC1 can determine that the integrity of the attestation token is verified successfully if all integrity checks are passed successfully. If one or more integrity checks fail, MPC1 can determine that the integrity of the attestation token is not verified successfully.

If the integrity of the attestation token is not verified successfully, MPC1 can ignore the message (540). For example, MPC1 can discard the message without performing any computations using the first secret share of the private data included in the attestation token. MPC1 can also send a notification to a trusted party to alert the trusted party that the verification failed.

If the integrity of the attestation token is verified successfully, MPC1 can perform computations to generate a first secret share of result data (550). MPC1 can execute a secure MPC protocol to perform secure multi-party computations in collaboration with each other MPC computer of the MPC cluster 130 to generate the first secret share of the result data. These computations are performed using at least the secret shares of the secret data and optionally other secret shares of other data and/or other cleartext data. At the end of the computations, each other MPC computer has a respective second secret share of the result data.

As described above, the computations can be to select a digital component for display by the client device. In another example, the computations can be to train a machine learning model using the secret shares of the secret data and secret shares of secret data received from other client devices.

The first secret share of the result data is sent to the client device (560). For example, MPC1 can send the first secret share of the result data to the client device. Each other MPC computer of the MPC cluster 130 can send its respective secret share of the result data to the client device. The client device can combine the secret shares of the result data to obtain the result data in cleartext. For example, if the result data is generated using additive secret sharing, the client device can add the secret shares together to obtain the secret data in cleartext.

Figure 6:
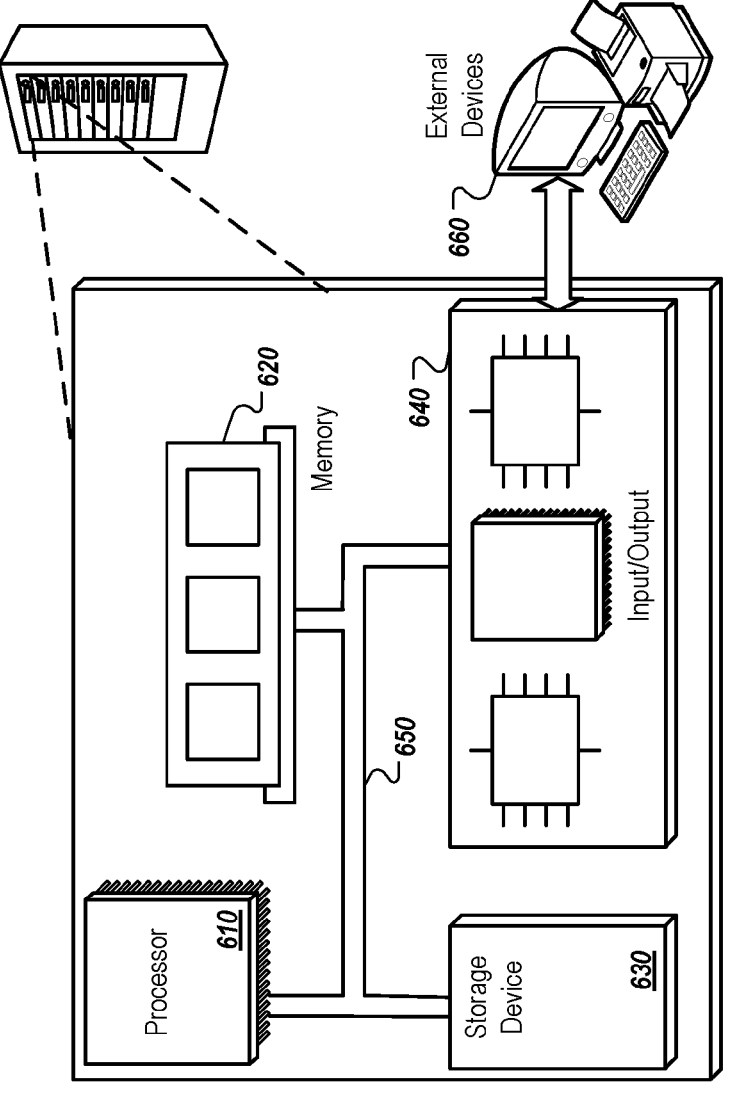
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In some implementations, the processor 610 is a single-threaded processor. In another implementation, the processor 610 is a multi-threaded processor. The processor 610 is capable of processing instructions stored in the memory 620 or on the storage device 630.

The memory 20 stores information within the system 600. In one implementation, the memory 620 is a computer-readable medium. In some implementations, the memory 620 is a volatile memory unit. In another implementation, the memory 620 is a non-volatile memory unit.

The storage device 630 is capable of providing mass storage for the system 600. In some implementations, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 40 provides input/output operations for the system 600. In some implementations, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 660, e.g., keyboard, printer and display devices. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method, comprising:
receiving, by a first multi-party computation (MPC) computer of a group of MPC computers configured to perform computations of a secure MPC protocol to select digital components for distribution to client devices, a first secret share of location information indicating a location of a client device;
generating, by the first MPC computer performing the computations of the secure MPC protocol in collaboration with one or more second MPC computers of the group of MPC computers, a first secret share of a selection result comprising data identifying a selected digital component that is selected from candidate digital components that are candidates for display at the client device based at least in part on the location of the client device; and
sending, to the client device, the first secret share of the selection result.

2. The computer-implemented method of claim 1, wherein generating the first secret share of the selection result comprises generating, for each digital component in a set of digital components, a first secret share of a candidate parameter that indicates whether the digital component is a candidate for display at the client device based on the location of the client device.

3. The computer-implemented method of claim 1, wherein generating the first secret share of the selection result comprises:
generating a garbled circuit based on (i) the location of the client device, (ii) a table of geographic location identifiers and, for each geographic location identifier, one or more geographical areas corresponding to the geographic location identifier, and (iii) for each of a plurality of digital components, data indicating a candidate expression that defines at least one or more geographic category identifiers for which the digital component is a candidate for selection; and
evaluating the garbled circuit to identify the candidate digital components.

4. The computer-implemented method of claim 3, wherein the candidate expression for at least one digital component further defines one or more user groups for which the at least one digital component is a candidate for selection.

5. The computer-implemented method of claim 3, wherein generating the first secret share of the selection result comprises identifying the candidate digital components based on geographic category identifiers corresponding to each digital component, wherein each geographic category identifier corresponds to one or more related geographical areas.

6. The computer-implemented method of claim 5, wherein identifying the candidate digital components based on geographic category identifiers corresponding to each digital component comprises determining, for each digital component, whether the location information matches a geographical area of a geographic category identifier corresponding to the digital component.

7. The computer-implemented method of claim 1, wherein receiving the first secret share of the location information indicating a location of the client device comprises:
receiving an attestation token comprising, as payload data, the first secret share of the location information and a device integrity element comprising a verdict of trustworthiness of the client device; and
verifying integrity of the attestation token.

8. The computer-implemented method of claim 7, wherein:
the attestation token comprises a digital signature generated using the payload data and a private key of the client device; and
verifying the integrity of the attestation token comprises determining that the digital signature is valid using the payload data and a public key corresponding to the private key.

9. The computer-implemented method of claim 1, wherein the first MPC computer and each of the one or more second MPC computers generate the first secret share of the selection result and a respective secret share of the selection result held by each second MPC computer based on the first secret share of the location match result and a respective second secret share of the location match result held by each second MPC computer.

10. The computer-implemented method of claim 1, wherein the location of the client device is a current location of the client device.

11. The computer-implemented method of claim 1, wherein the location information indicates one or more previous locations of the client device.

12. A system comprising:

one or more processors; and one or more storage devices storing instructions that, when executed by the one or more processors, cause the one or more processors to perform operations comprising:

receiving, by a first multi-party computation (MPC) computer of a group of MPC computers configured to perform computations of a secure MPC protocol to select digital components for distribution to client devices, a first secret share of location information indicating a location of a client device;

generating, by the first MPC computer performing the computations of the secure MPC protocol in collaboration with one or more second MPC computers of the group of MPC computers, a first secret share of a selection result comprising data identifying a selected digital component that is selected from candidate digital components that are candidates for display at the client device based at least in part on the location of the client device; and sending, to the client device, the first secret share of the selection result.

13. The system of claim 12, wherein generating the first secret share of the selection result comprises generating, for each digital component in a set of digital components, a first secret share of a candidate parameter that indicates whether the digital component is a candidate for display at the client device based on the location of the client device.

14. The system of claim 12, wherein generating the first secret share of the selection result comprises:

generating a garbled circuit based on (i) the location of the client device, (ii) a table of geographic location identifiers and, for each geographic location identifier, one or more geographical areas corresponding to the geographic location identifier, and (iii) for each of a plurality of digital components, data indicating a candidate expression that defines at least one or more geographic category identifiers for which the digital component is a candidate for selection; and evaluating the garbled circuit to identify the candidate digital components.

15. The system of claim 14, wherein the candidate expression for at least one digital component further defines one or more user groups for which the at least one digital component is a candidate for selection.

16. The system of claim 12, wherein generating the first secret share of the selection result comprises identifying the candidate digital components based on geographic category identifiers corresponding to each digital component, wherein each geographic category identifier corresponds to one or more related geographical areas.

17. The system of claim 16, wherein identifying the candidate digital components based on geographic category identifiers corresponding to each digital component comprises determining, for each digital component, whether the location information matches a geographical area of a geographic category identifier corresponding to the digital component.

18. The system of claim 12, wherein receiving the first secret share of the location information indicating a location of the client device comprises:

receiving an attestation token comprising, as payload data, the first secret share of the location information and a device integrity element comprising a verdict of trustworthiness of the client device; and verifying integrity of the attestation token.

19. The system of claim 18, wherein:

the attestation token comprises a digital signature generated using the payload data and a private key of the client device; and verifying the integrity of the attestation token comprises determining that the digital signature is valid using the payload data and a public key corresponding to the private key.

20. A non-transitory computer readable storage medium carrying instructions that, when executed by one or more processors, cause the one or more processors to perform operations comprising:

receiving, by a first multi-party computation (MPC) computer of a group of MPC computers configured to perform computations of a secure MPC protocol to select digital components for distribution to client devices, a first secret share of location information indicating a location of a client device;

generating, by the first MPC computer performing the computations of the secure MPC protocol in collaboration with one or more second MPC computers of the group of MPC computers, a first secret share of a selection result comprising data identifying a selected digital component that is selected from candidate digital components that are candidates for display at the client device based at least in part on the location of the client device; and sending, to the client device, the first secret share of the selection result.

* * * * *